United States Patent
Gresset

(10) Patent No.: US 10,009,906 B2
(45) Date of Patent: Jun. 26, 2018

(54) METHOD FOR PERFORMING INTERFERENCE ESTIMATION, COMPUTER PROGRAM THEREOF, NON-TRANSITORY INFORMATION STORAGE MEDIUM THEREOF, AND PROCESSING DEVICE ADAPTED FOR PERFORMING INTERFERENCE ESTIMATION

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days. days.

(21) Appl. No.: 15/547,022

(22) PCT Filed: Feb. 12, 2016

(86) PCT No.: PCT/JP2016/054768
§ 371 (c)(1),
(2) Date: Jul. 27, 2017

(87) PCT Pub. No.: WO2016/136598
PCT Pub. Date: Sep. 1, 2016

(65) Prior Publication Data
US 2018/0027570 A1     Jan. 25, 2018

(30) Foreign Application Priority Data
Feb. 27, 2015   (EP) .................................... 15156881

(51) Int. Cl.
*H04W 72/08*   (2009.01)
*H04W 24/10*   (2009.01)
*H04W 72/04*   (2009.01)

(52) U.S. Cl.
CPC ......... *H04W 72/082* (2013.01); *H04W 24/10* (2013.01); *H04W 72/044* (2013.01); *H04W 72/0406* (2013.01)

(58) Field of Classification Search
CPC . H04W 72/082; H04W 24/10; H04W 72/044; H04W 72/0406
See application file for complete search history.

(56) References Cited

U.S. PATENT DOCUMENTS 9,571,205 B1 *  2/2017  Suarez ................... G02F 2/002
2004/0203716 A1 * 10/2004  Tillotson ............... H04W 16/00
                                                                455/423

(Continued)

FOREIGN PATENT DOCUMENTS

EP     1 959 702 A1    8/2008
EP     2 688 351 A1    1/2014

OTHER PUBLICATIONS

International Search Report for PCT/JP2016/054768 (PCT/ISA/210) dated May 12, 2016.

(Continued)

*Primary Examiner* — Brandon J Miller
(74) *Attorney, Agent, or Firm* — Birch, Stewart, Kolasch & Birch, LLP

(57) ABSTRACT

A processing device: obtains first observations of interference performed during at least one first journey for at least one first portion of a path; obtains second observations of interference performed during the first journey(s) for a second portion of said path; obtaining third observations of interference performed during a second journey for said first portion(s); estimating the interference expected to be encountered on said second portion during said second journey, by combining the obtained first, second and third observations such that the part of the third observations related to interference induced by wayside interferers is (Continued)

substantially compensated by the first observations and the part of the second observations related to interference induced by on-board interferers is substantially compensated by the first observations.

14 Claims, 9 Drawing Sheets

(56) References Cited

U.S. PATENT DOCUMENTS

| | | | | |
|---|---|---|---|---|
| 2008/0299965 A1* | 12/2008 | Lagerman | .......... | H04B 7/18506 455/431 |
| 2010/0100308 A1* | 4/2010 | Coulmeau | .............. | G08G 5/006 701/122 |
| 2011/0028163 A1* | 2/2011 | Hoshihara | .............. | H04B 15/04 455/456.1 |
| 2011/0263199 A1* | 10/2011 | Cruz | .................. | H04B 7/18506 455/12.1 |
| 2014/0256341 A1 | 9/2014 | Nayeb Nazar et al. | | |
| 2015/0163817 A1* | 6/2015 | Brunel | ................ | H04W 72/082 370/329 |

OTHER PUBLICATIONS

Written Opinion of the International Searching Authority for PCT/JP2016/054768 (PCT/ISA/237) dated May 12, 2016.

\* cited by examiner

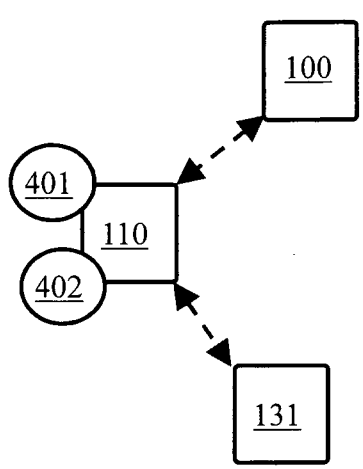
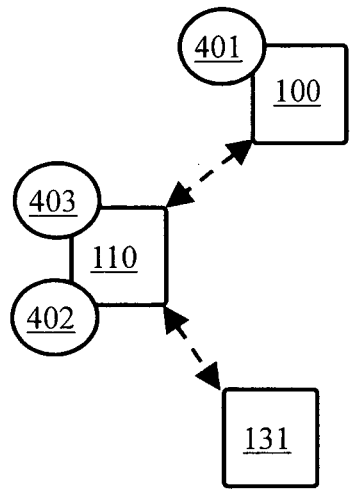
Fig. 4C                Fig. 4D
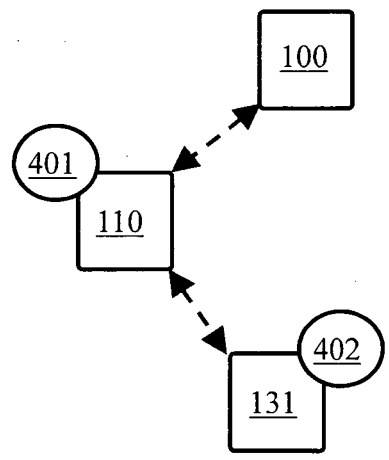
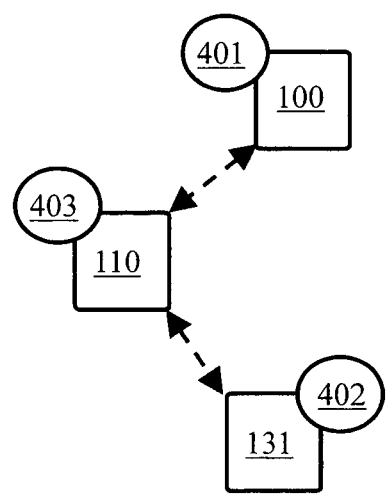
Fig. 4E                Fig. 4F

METHOD FOR PERFORMING INTERFERENCE ESTIMATION, COMPUTER PROGRAM THEREOF, NON-TRANSITORY INFORMATION STORAGE MEDIUM THEREOF, AND PROCESSING DEVICE ADAPTED FOR PERFORMING INTERFERENCE ESTIMATION

TECHNICAL FIELD

The present invention generally relates to estimating interference expected to be encountered with downlink communications from an access point of a wireless telecommunications network to a communication device located in a moving conveyance moving on a path, wherein on-board interferers and wayside interferers imply frequency-selective interference with said downlink communications.

BACKGROUND ART

In wireless communications, transmission channel resources are usually defined as parameters of a multiple access transmission technology that allows several devices to transmit on a same frequency channel in a same time frame, where the time domain is sequentially divided into time frames. For example, in TDMA (Time Division Multiple Access), the transmission channel resources are time periods in a time frame; in FDMA (Frequency Division Multiple Access), the transmission channel resources are sub-parts of the frequency spectrum used for communication over the whole time frame; and, in CDMA (Code Division Multiple Access), the transmission channel resources are spreading codes used during the whole time frame. Also, several multiple access technologies can be used at the same time.

Interference observed by a receiver device, in the scope of a communication in which the receiver device is expected to receive a signal from a source device, is defined as one or more signals transmitted by one or more respective other source devices to at least one other receiver device via the same transmission channel resources as used by said source device to communicate with said receiver device.

In an illustrative situation, access points (APs) of a wireless telecommunications system are deployed along a path over which a moving conveyance moves in order to offer wireless communications services to communication devices located in the moving conveyance. For instance, the moving conveyance is a train and the path is a railroad. The APs can be connected to a server implemented in a core network or be directly connected one with each other in order to respectively implement centralized or decentralized transmission channel resources management and/or mobility management functionalities. When the moving conveyance moves along the path, the considered communication devices located in the moving conveyance are assumed to communicate with the AP providing the most robust data link through hand-over procedures. Such communications with the APs use transmission channel resources typically allocated by the APs or the aforementioned server.

SUMMARY OF INVENTION

Technical Problem

Usually, such transmission channel resources correspond to a channel in the ISM (Industrial, Scientific and Medical) radio band, which implies that neighboring devices also use the same transmission channel resources with a high probability. Therefore, many communications may occur concurrently in an unlicensed spectrum, which generate interference that may be damageable for successfully performing the downlink communications in the wireless telecommunication system. Sources of such interference may be on-board, i.e. located in the moving conveyance, or wayside, i.e. located along the path on which the moving conveyance moves. Appropriately estimating interference expected to be encountered by downlink communications performed along the path of the moving conveyance is therefore a key issue for allocating transmission channel resources in order to increase performance of the downlink communications.

Solution to Problem

To that end, the present invention concerns a method for performing an interference estimation of an interference expected to be encountered by downlink communications in a wireless telecommunication system toward a communication device located inside a moving conveyance moving over a path, the interference being expected to be encountered due to presence of wayside interferers and presence of on-board interferers. Wayside interferers are devices present along said path and generating signals in a same frequency band as considered downlink communications within the wireless telecommunication system, and on-board interferers are devices present in a considered moving conveyance moving over the path and generating signals in the same frequency band as the considered downlink communications within the wireless telecommunication system. The method is such that a processing device performs: obtaining first observations of interference with downlink communications performed during at least one first journey along the path for at least one first portion of said path, said first observations being representative of a combination of interference induced by any wayside interferers present along said first portion(s) of said path and of interference induced by any on-board interferers present during said first journey(s) over said first portion(s) of said path; obtaining second observations of interference with downlink communications performed during the first journey(s) along the path for a second portion of said path, said second portion being located closer than said first portion(s) on said path regarding a destination of said moving conveyance, said second observations being representative of a combination of interference induced by any wayside interferers present along said second portion of said path and of interference induced by any on-board interferers present during said first journey(s) over said second portion of said path; obtaining third observations of interference with downlink communications performed during a second journey for said first portion(s) of said path, said third observations being representative of a combination of interference induced by any wayside interferers present along said first portion(s) of said path and of interference induced by any on-board interferers present during said second journey over said first portion(s) of said path; and performing the interference estimation of the interference expected to be encountered by downlink communications toward the communication device located inside the moving conveyance when the moving conveyance is on said second portion of said path during said second journey, by combining the obtained first, second and third observations such that the part of the third observations which is related to interference induced by wayside interferers is substantially compensated by the first observations and the part of the second observations which is related to interference induced by on-board interferers is substantially compensated by the first observations.

Thus, the interference to be encountered on the second portion of the path during the second journey can be easily determined by relying on interference observations performed during various journeys over the path, since said method doesn't require distinguishing interference induced by wayside interferers from interference induced by on-board interferers. Thus, the interference expected in said second portion of said path in which the moving conveyance will eventually enter can be predicted, and this knowledge can be used for the purpose of optimizing transmission parameters.

According to a particular feature, the method is such that: the first observations of interference and the third observations of interference relate to one first portion of the path; the first observations of interference and the second observations of interference relate to one first journey; the first, second and third observations of interference are histograms representative of interference probability density functions. Furthermore, the processing device performs: applying a Discrete Fourier Transform operation to each histogram of the first, second and third observations of interference, in order to obtain a discrete version of a characteristic function corresponding to said histogram; determining, independently for each value of a frequency index l, an estimation $\psi^*_{n,k}$ of a characteristic function $\psi_{n,k}$ of the interference encountered by the downlink communications toward the communication device located inside the moving conveyance when the moving conveyance is on said second portion of said path during said second journey, as follows:

$$\psi^*_{n,k}(l) \approx \frac{\psi_{n,k'}(l)\psi_{n',k}(l)}{\psi_{n',k'}(l)}$$

wherein $\psi_{n,k'}$ represents the characteristic function of interference obtained for the second observations of interference, $\psi_{n',k}$ represents the characteristic function of interference obtained for the third observations of interference, wherein $\psi_{n',k'}$ represents the characteristic function of interference obtained for the first observations of interference; and performing the interference estimation in the form of an histogram representative of an interference probability density function, by applying an Inverse Discrete Fourier Transform operation to the estimation $\psi^*_{n,k}$.

Thus, the histogram or quantiles of interference levels in said second portion of said path in which the moving conveyance will eventually enter can be predicted, and this knowledge can be used for the purpose of optimizing transmission parameters.

According to a particular feature, a fingerprint map stores, for each portion of the path, observations of interference performed during preceding journeys over the path in the form of respective histograms of interference, and the processing device performs, before performing the interference estimation: merging the observations stored in the fingerprint map with respect to plural first portions, so as to obtain the first observations of interference in the form of a merged histogram of interference that relates to one virtual first journey and to one virtual first portion; merging the observations stored in the fingerprint map with respect to the second portion, so as to obtain the second observations of interference in the form of a merged histogram of interference that relates to said virtual first journey; and merging observations performed during said second journey with respect to the first portions, so as to obtain the third observations of interference in the form of a merged histogram of interference that relates to said virtual first portion.

Thus, the computation of the interference estimation is simple and accurate.

According to a particular feature, a fingerprint map stores, for each portion of the path, one histogram of interference representative of merged observations of interference performed during preceding journeys over the path, and in that the processing device performs, before updating the fingerprint map with new observations: merging, for each portion of the path, a part of the new observations performed with respect to said portion of the path and the observations stored in the fingerprint map with respect to said portion, in order to obtain a merged histogram of interference that relates to one virtual first journey over said portion; storing in the fingerprint map, for each portion of the path, the merged histogram of interference obtained with respect to said portion of the path. Furthermore, the processing device performs, before performing the interference estimation: merging the observations stored in the fingerprint map with respect to plural first portions, so as to obtain the first observations of interference in the form of a merged histogram of interference that relates to one virtual first portion; and merging observations performed during said second journey with respect to the first portions, so as to obtain the third observations of interference in the form of a merged histogram of interference that relates to said one virtual first portion.

Thus, the computation of the interference estimation is simple and accurate and less memory is needed for storing the histograms in the fingerprint map.

According to a particular feature, the method is such that: the first observations of interference and the third observations of interference are representative of one first portion of the path; the first observations of interference and the second observations of interference are representative of one first journey; the first, second and third observations of interference are characteristic functions of interference. Furthermore, the processing device performs: performing the interference estimation in the form of a characteristic function, by determining, independently for each value of a frequency index l, an estimation $\psi^*_{n,k}$ of said characteristic function, as follows:

$$\psi^*_{n,k}(l) \approx \frac{\psi_{n,k'}(l)\psi_{n',k}(l)}{\psi_{n',k'}(l)}$$

wherein $\psi_{n,k'}$ represents the characteristic function of interference obtained for the second observations of interference, $\psi_{n',k}$ represents the characteristic function of interference obtained for the third observations of interference, wherein $\psi_{n',k'}$ represents the characteristic function of interference obtained for the first observations of interference.

Thus, the computation of the estimation of the interference histogram or quantiles is simple.

According to a particular feature, a fingerprint map stores, for each portion of the path, observations of interference performed during preceding journeys over the path in the form of respective characteristic function of interference, and the processing device performs, before performing the interference estimation: merging the observations stored in the fingerprint map with respect to plural first portions, so as to obtain the first observations of interference in the form of a merged characteristic function of interference that relates to one virtual first journey and to one virtual first portion; merging the observations stored in the fingerprint map with respect to the second portion, so as to obtain the second observations of interference in the form of a merged characteristic function of interference that relates to said virtual first journey; and merging observations performed during said second journey with respect to the first portions, so as to obtain the third observations of interference in the form of a merged characteristic function of interference that relates to said virtual first portion.

Thus, by storing characteristic functions instead of histograms, no conversion of histograms into characteristic functions is done before the estimation process, which reduces the latency of the processing of the estimation, which is particularly advantageous when the moving conveyance is moving fast.

According to a particular feature, a fingerprint map stores, for each portion of the path, one characteristic function of interference representative of merged observations of interference performed during preceding journeys over the path, and the processing device performs, before updating the fingerprint map with new observations: merging, for each portion of the path, a part of the new observations performed with respect to said portion of the path and the observations stored in the fingerprint map with respect to said portion, in order to obtain a merged characteristic function of interference that relates to one virtual first journey over said portion; storing in the fingerprint map, for each portion of the path, the merged characteristic function of interference obtained with respect to said portion of the path. Furthermore, the processing device performs, before performing the interference estimation: merging the observations stored in the fingerprint map with respect to plural first portions, so as to obtain the first observations of interference in the form of a merged characteristic function of interference that relates to one virtual first portion; and merging observations performed during said second journey with respect to the first portions, so as to obtain the third observations of interference in the form of a merged characteristic function of interference that relates to said one virtual first portion.

Thus, less memory is needed for storing the characteristic functions in the fingerprint map.

According to a particular feature, the method is such that: the first observations of interference and the third observations of interference relate to one first portion of the path; the first observations of interference and the second observations of interference relate to one first journey; the first, second and third observations of interference are average values of interference level. Furthermore, the processing device performs the interference estimation in the form of an average value of interference level by adding the third observations to the second observations and further subtracting the first observations.

Thus, the average interference level estimation is extremely simple.

According to a particular feature, a fingerprint map stores, for each portion of the path, observations of interference performed during preceding journeys over the path in the form of respective average values of interference level, and the processing device performs, before performing the interference estimation: merging the observations stored in the fingerprint map with respect to plural first portions, so as to obtain the first observations of interference in the form of a merged average value of interference level that relates to one virtual first journey and to one virtual first portion; merging the observations stored in the fingerprint map with respect to the second portion, so as to obtain the second observations of interference in the form of a merged average value of interference level that relates to said virtual first journey; and merging observations performed during said second journey with respect to the first portions, so as to obtain the third observations of interference in the form of a merged average value of interference level that relates to said virtual first portion.

Thus, the average interference level estimation is extremely simple and takes into account more observations, which makes the estimation more accurate.

According to a particular feature, a fingerprint map stores, for each portion of the path, one average value of interference level representative of merged observations of interference performed during preceding journeys over the path, and the processing device performs, before updating the fingerprint map with new observations: merging, for each portion of the path, a part of the new observations performed with respect to said portion of the path and the observations stored in the fingerprint map with respect to said portion, in order to obtain a merged average value of interference level that relates to one virtual first journey over said portion; storing in the fingerprint map, for each portion of the path, the merged average value of interference level obtained with respect to said portion of the path. Furthermore, the processing device performs, before performing the interference estimation: merging the observations stored in the fingerprint map with respect to plural first portions, so as to obtain the first observations of interference in the form of a merged average value of interference level that relates to one virtual first portion; and merging observations performed during said second journey with respect to the first portions, so as to obtain the third observations of interference in the form of a merged average value of interference level that relates to said one virtual first portion.

Thus, less memory is needed for storing observations in the fingerprint map.

According to a particular feature, the method is such that: the first observations of interference and the third observations of interference relate to plural N−1 first portions of the path; the first observations of interference and the second observations of interference relate to plural K−1 first journeys; the first, second and third observations of interference are average values of interference level. Furthermore, the processing device performs the interference estimation in the form of an average value of interference level by determining a value eU such that:

$$eU=(eA)F(EU)$$

wherein e is a vector of size equal to NK such that:

$$e=[1, 0, \ldots, 0]$$

wherein E is a matrix of size equal to (NK−1)×(NK), as follows:

$$E = \begin{bmatrix} 0 & 1 & 0 & \ldots & 0 \\ 0 & 0 & \ddots & \ddots & \vdots \\ 0 & \vdots & \ddots & \ddots & 0 \\ 0 & 0 & \ldots & 0 & 1 \end{bmatrix}$$

wherein U is a vector of interference that presents firstly the average value of interference level to be estimated, then the observations performed along the K−1 first portions during the second journey in inverse order compared to the order in which said first portions appear on said path, and then similarly the observations performed along the K portions of the path during the first journeys in inverse order compared to the order in which said journeys occurred, wherein A is a matrix of size equal to NK×(N+K) consisting of two vertical groups of K sub-matrices, the first group in sequence consisting of K identity matrices of size N arranged vertically, the last group in sequence consisting of K sub-matrices of size N×K having a column with ones at the i-th position and columns of zeros elsewhere, wherein i is the value of an index from 1 to K representative of the vertical position of the considered sub-matrix, wherein F is a matrix such that:

EAFEU=EU and wherein the matrix F is obtained during a pre-processing step by minimizing the following over-determined least square problem:

|EAF−I|² wherein I is an identity matrix.

Thus, accuracy of the interference level estimation is improved.

The present invention also concerns a processing device adapted for performing an interference estimation of an interference expected to be encountered by downlink communications in a wireless telecommunication system toward a communication device located inside a moving conveyance moving over a path, the interference being expected to be encountered due to presence of wayside interferers and presence of on-board interferers, wherein wayside interferers are devices present along said path and generating signals in a same frequency band as considered downlink communications within the wireless telecommunication system, and on-board interferers are devices present in a considered moving conveyance moving over the path and generating signals in the same frequency band as the considered downlink communications within the wireless telecommunication system. The processing device comprises: means for obtaining first observations of interference with downlink communications performed during at least one first journey along the path for at least one first portion of said path, said first observations being representative of a combination of interference induced by any wayside interferers present along said first portion(s) of said path and of interference induced by any on-board interferers present during said first journey(s) over said first portion(s) of said path; means for obtaining second observations of interference with downlink communications performed during the first journey(s) along the path for a second portion of said path, said second portion being located closer than said first portion(s) on said path regarding a destination of said moving conveyance, said second observations being representative of a combination of interference induced by any wayside interferers present along said second portion of said path and of interference induced by any on-board interferers present during said first journey(s) over said second portion of said path; means for obtaining third observations of interference with downlink communications performed during a second journey for said first portion(s) of said path, said third observations being representative of a combination of interference induced by any wayside interferers present along said first portion(s) of said path and of interference induced by any on-board interferers present during said second journey over said first portion(s) of said path; and means for performing the interference estimation of the interference expected to be encountered by downlink communications toward the communication device located inside the moving conveyance when the moving conveyance is on said second portion of said path during said second journey, by combining the obtained first, second and third observations such that the part of the third observations which is related to interference induced by wayside interferers is substantially compensated by the first observations and the part of the second observations which is related to interference induced by on-board interferers is substantially compensated by the first observations.

The present invention also concerns a computer program that can be downloaded from a communication network and/or stored on a medium that can be read by a processing device. This computer program comprises instructions for causing implementation of the aforementioned method, when said program is run by the processing device. The present invention also concerns information storage means, storing a computer program comprising a set of instructions causing implementation of the aforementioned method, when the stored information is read from said information storage means and run by the processing device.

Since the features and advantages related to the processing device and to the computer program are identical to those already mentioned with regard to the corresponding aforementioned method, they are not repeated here.

The characteristics of the invention will emerge more clearly from a reading of the following description of an example of embodiment, said description being produced with reference to the accompanying drawings, among which:

BRIEF DESCRIPTION OF THE DRAWINGS

FIG. 4C schematically represents configurations of the wireless telecommunications system for implementing the present invention.

FIG. 4D schematically represents configurations of the wireless telecommunications system for implementing the present invention.

FIG. 4E schematically represents configurations of the wireless telecommunications system for implementing the present invention.

FIG. 4F schematically represents configurations of the wireless telecommunications system for implementing the present invention.

DESCRIPTION OF EMBODIMENTS

In order to increase performance of downlink communications in a wireless telecommunication system between access points located along a path over which a moving conveyance is moving and a communication device located inside the moving conveyance, while on-board interferers and wayside interferers imply frequency-selective interference with said downlink communications, it is proposed to estimate interference expected to be encountered by said downlink communications without differentiating interference due to on-board interferers and interference due to wayside interferers. This approach simplifies interference estimation and historical data gathering process for performing such interference estimation. However, it has to be noticed that, contrary to wayside interferers, on-board interferers typically differs from one journey along the path to another journey along said path.

Figure 1:
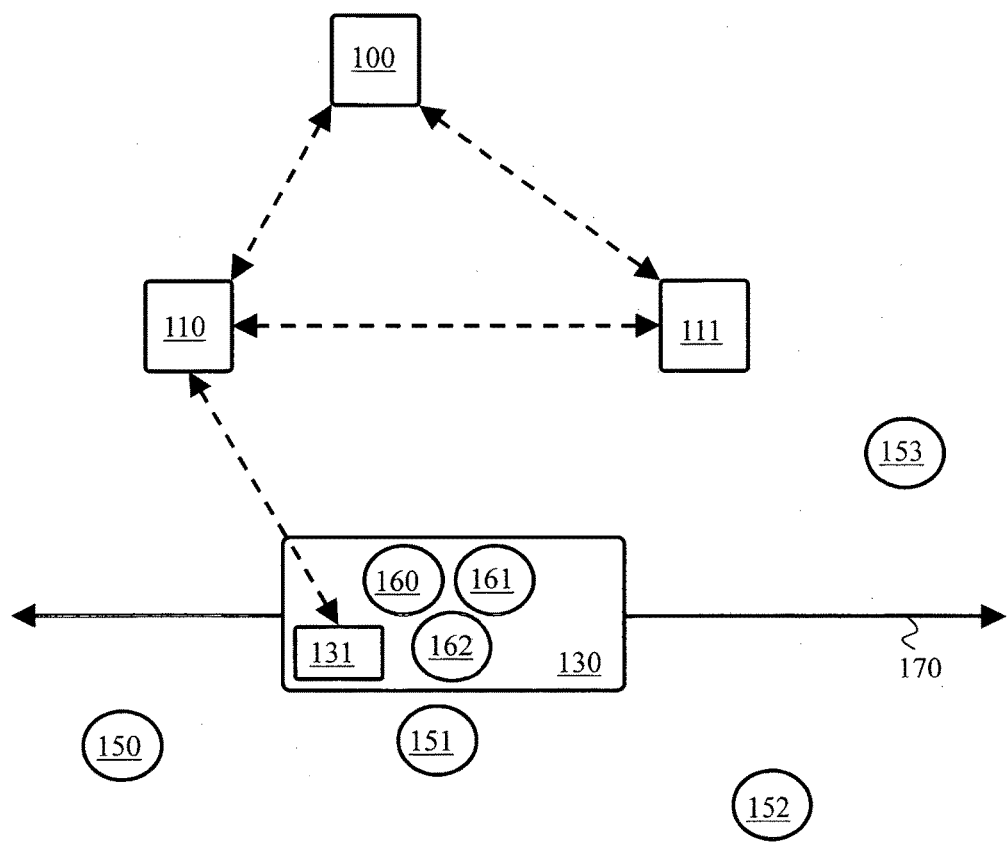
FIG. 1 schematically represents a wireless telecommunications system in which the present invention may be implemented.

FIG. 1 schematically represents a wireless telecommunications system in which the present invention may be implemented.

The wireless telecommunications system comprises APs 110, 111 located along a path 170 over which moving conveyances perform journeys. FIG. 1 shows a moving conveyance 130 that performs a journey on the path 170. The moving conveyances are for instance trains and the path is a railroad guiding the trains from a departure station to an arrival station. According to another example, the moving conveyances are buses and the path is a predefined route followed by the buses.

The APs 110, 111 offer services of the wireless telecommunications system to communication devices located in said moving conveyances, such as a communication device 131 located in the moving conveyance 130. The communication device 131 is for instance a mobile terminal or a relay station enabling mobile terminals located in the moving conveyance to access the services of the wireless telecommunications system.

The wireless telecommunications system may further comprise a server 100, for instance implemented in a core network implementing centralized radio resources management and/or mobility management functionalities.

The APs 110, 111 may in a variant be interconnected one with each other, thus implementing decentralized radio resources management and/or mobility management functionalities.

Quasi-static interferers 150, 151, 152, 153 may be located sufficiently close to the path 170 of the moving conveyance 130 to impact downlink communications from one of the APs 110, 111 to the communication device 131 located in the moving conveyance 130. Such interferers 150, 151, 152, 153 are for instance Wi-Fi (registered trademark) access points, conforming to the IEEE 802.11 standards. Such quasi-static interferers 150, 151, 152, 153 may also be microwave ovens installed in premises or places located along the path 170.

On-board interferers 160, 161, 162 may be located inside the moving conveyance 130 and therefore move with said moving conveyance. These interferers 160, 161, 162 impact downlink communications from one of the APs, 110, 111 to the communication device 131 located in the moving conveyance 130. Such interferers are for instance Bluetooth® devices, conforming to the IEEE 802.15.1 standards, or Zigbee (registered trademark) devices, conforming to the IEEE 802.15.4 standards.

A processing device is in charge of estimating interference expected to be encountered by the downlink communications from the APs to the communication device 131 located in the moving conveyance 130 during a journey of the moving conveyance 130 along the path 170. Estimating such interference allows improving performance of said downlink communications by determining the appropriate transmission channel resources allocation according to said estimated interference. As will be detailed hereafter with regard to FIGS. 4A to 4G, the processing device can be located in, or connected to, the server 100, or the APs 110, 111, or the communication device 131 located in the moving conveyance 130. The processing device is preferably collocated with the device in charge of determining the appropriate transmission channel resources allocation. Plural instances of the processing device may also be present in the wireless telecommunication system.

Figure 2:
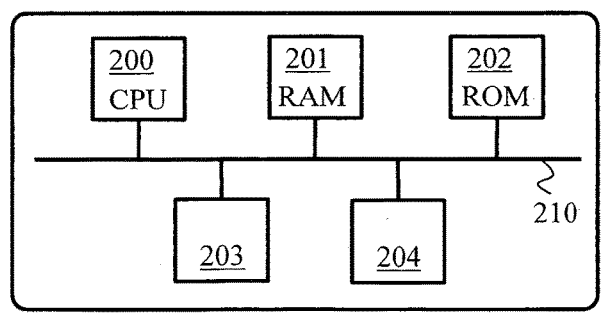
FIG. 2 schematically represents an architecture of a processing device of the wireless telecommunications system.

FIG. 2 schematically represents an architecture of the processing device. According to the shown architecture, the processing device comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard-Disk Drive) or an SD (Secure Digital) card reader 203, or any other device adapted to read information stored on storage means; and at least one communication interface 204. The communication interface 204 allows the processing device to communicate directly, or indirectly (i.e. using another device as a relay), with the device in charge of determining the appropriate transmission channel resources allocation.

CPU 200 is capable of executing instructions loaded into RAM 201 from ROM 202 or from an external memory, such as an SD card via the SD card reader 203. After the processing device has been powered on, CPU 200 is capable of reading instructions from RAM 201 and executing these instructions. The instructions form one computer program that causes CPU 200 to perform some or all of the steps of the algorithm described hereafter with regard to FIG. 3.

Figure 3:
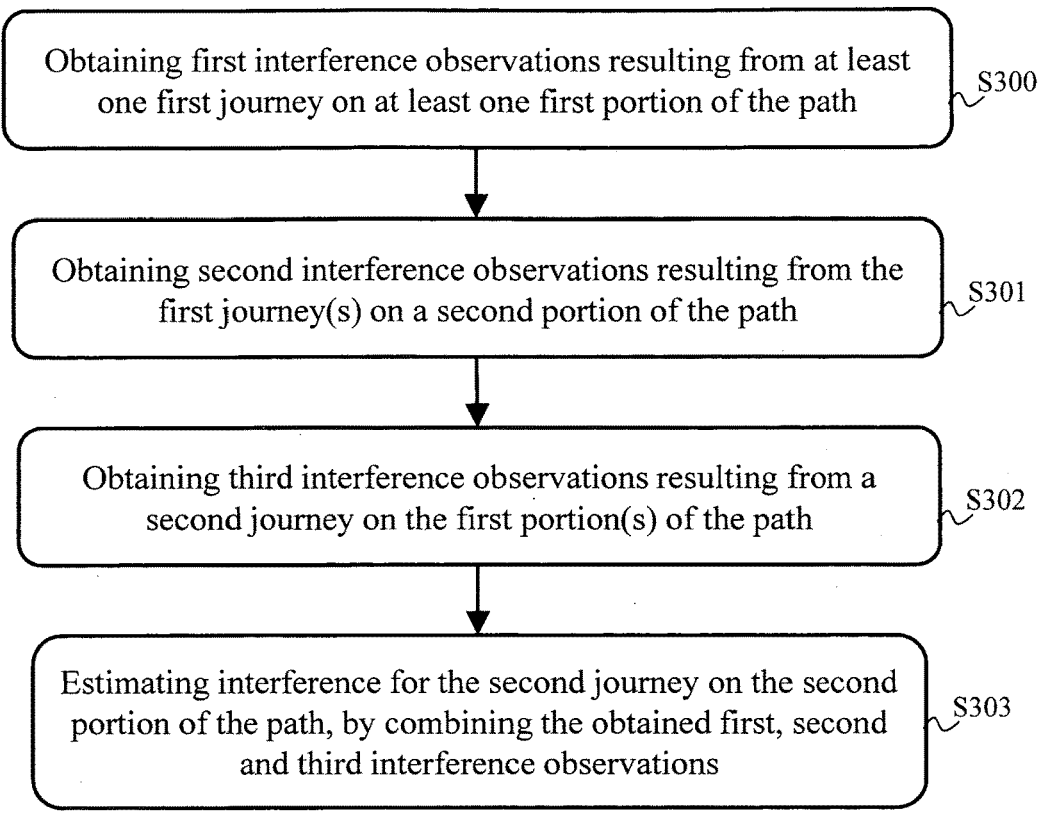
FIG. 3 schematically represents an algorithm for estimating interference expected to be encountered by downlink communications within the wireless telecommunications system.

Any and all steps of the algorithm described hereafter with regard to FIG. 3 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm for estimating interference expected to be encountered by downlink communications within the wireless telecommunications system. The algorithm of FIG. 3 is performed by the processing device and is more particularly described regarding downlink communications from at least one of the APs 110, 111 to the communication device 131 located in the moving conveyance 130.

In a step S300, the processing device obtains first observations of interference with downlink communications performed during at least one first journey along the path 170 for at least one first portion of said path 170. Said first observations are representative of a combination of interference induced by any wayside interferers present along said first portion(s) of said path 170 and of interference induced by any on-board interferers present during said first journey(s) over said first portion(s) of said path 170.

The path 170 is hence decomposed into portions. During each journey over said path 170, interference encountered by downlink communications involving a considered communication device, such as the communication device 131 for the moving conveyance 130, that a considered moving conveyance embeds are observed. Such interference is observed on a per portion basis. Interference observations are performed by the considered communication device that the considered moving conveyance embeds.

The interference observations can be obtained from measurements performed by the APs of the wireless telecommunication system and/or by the considered communication device that the considered moving conveyance embeds. For example, the measurements are received signal power on a given transmission channel resource and averaged over time, or an averaged frame error rate from which a signal-to-interference-plus-noise ratio (SINR) can be deduced, hence an interference level. Interference observations can also rely on statistics of acknowledgement signals when ACK/NACK mechanisms are implemented within the wireless telecommunication system.

Interference observations performed during a journey of a moving conveyance along the path 170 are preferably stored in a fingerprint map, which can be located in the wireless telecommunications system as detailed hereafter with regard to FIGS. 4A to 4G.

In a following step S301, the processing device obtains second observations of interference with downlink communications performed during the first journey(s) along the path 170 for a second portion of said path 170. Said second portion is located closer than said first portion(s) on said path 170 regarding a destination place (e.g. arrival station) of the moving conveyance 130, which can also be expressed as said second portion is located further than said first portion(s) on said path 170 regarding a departure place (e.g. departure station) of the moving conveyance 130. Said second observations are representative of a combination of interference induced by any wayside interferers present along said second portion of said path 170 and of interference induced by any on-board interferers present during said first journey(s) over said second portion of said path 170.

In a following step S302, the processing device obtains third observations of interference with downlink communications performed during a second journey for said first portion(s) of said path 170. The second journey is the one performed by the moving conveyance 130 and for which interference estimation has to be performed. More precisely, the interference estimation has to be performed regarding downlink communications to be performed between the communication device 131 located in the moving conveyance 130 and each AP of the wireless telecommunication system located on said second portion of the path 170 (which has been mentioned above with regard to step S301). Said third observations are representative of a combination of interference induced by any wayside interferers present along said first portion(s) of said path 170 and of interference induced by any on-board interferers present during said second journey over said first portion(s) of said path 170.

In a following step S303, the processing device estimates the interference expected to be encountered by downlink communications between the communication device 131 located inside the moving conveyance 130 and said APs present on said second portion of the path 170, i.e. when the moving conveyance 130 is on said second portion of the path 170 during said second journey. The processing device estimates said interference by combining the obtained first, second and third observations such that the part of the third observations which is related to interference induced by wayside interferers is substantially compensated by the first observations and the part of the second observations which is related to interference induced by on-board interferers is substantially compensated by the first observations.

According to a first embodiment, the first observations of interference and the third observations of interference concern one portion of the path 170, and the first observations of interference and the second observations of interference concern a single journey over said path 170. Only two portions of the path 170 are therefore considered by the processing device: the first portion and the second portion. Moreover, the first observations of interference, the second observations of interference and the third observations of interference are average values of interference level observed over the corresponding portion of the path 170. The processing device estimates the average value of interference level expected to be encountered by downlink communications between the communication device 131 located inside the moving conveyance 130 and said APs present on said second portion of the path 170, by adding the obtained third observations (observations on the first portion during the second journey) to the obtained second observations (observations on the second portion during the first journey) and further subtracting the obtained first observations (observations on the first portion during the first journey). Considering that the average value of interference level induced by on-board interferers does not significantly change from the first portion to the second portion in a single journey, the part of the second observations which is related to interference induced by on-board interferers is substantially compensated by subtracting the first observations. And, considering that the average value of interference level induced by wayside interferers on each portion of the path does not significantly change from one journey to another, the part of the third observations which is related to interference induced by wayside interferers is substantially compensated by subtracting the first observations. Therefore, by adding the obtained third observations to the obtained second observations and further subtracting the obtained first observations, it remains an estimated sum of the average value of interference level induced by on-board interferers present in the moving conveyance 130 and the average value of interference level induced by wayside interferers present on the second portion of the path 170.

Indeed, let's denote Y*(n, k) the average value of interference level expected to be encountered by downlink communications between the communication device 131 located inside the moving conveyance 130 and said APs present on said second portion of the path 170, wherein n represents said second portion of the path 170 and k represents the second journey. Let's denote Y(n', k') the first observations of interference, wherein n' represents said first portion of the path 170 and k' represents the first journey. Logically, Y(n, k') represents the second observations of interference and Y(n', k) represents the third observations of interference. Generally speaking, Y represents observations of average value of interference level and Y* represents estimation of average value of interference level. Let's further denote T the part of interference observations induced by on-board interferers and W the part of interference observations induced by wayside interferers. Thus, obtaining the estimated average value of interference level by adding the obtained third observations to the obtained second observations and further subtracting the obtained first observations is expressed as follows:

$$Y^*(n, k)=Y(n', k)+Y(n, k)-Y(n', k')$$

which can be decomposed as follows:

$$Y^*(n, k)=T(n', k)+W(n', k)+T(n, k')+W(n, k')-T(n', k')-W(n', k').$$

By considering that the average value of interference level induced by the on-board interferers is substantially identical during the first portion of the path and during the second portion of the path in a same journey, and by further considering that the average value of interference level induced by wayside interferers is substantially identical during the first journey and during the second journey in a same portion of the path 170, then $$Y^*(n, k) \approx T(n', k)+W(n, k') \approx T(n, k)+W(n, k)$$

which is consistent with the definition of the average value of interference level to be estimated. Therefore, the part W(n', k) of the third observations Y(n', k) which is related to the average value of interference level induced by wayside interferers is substantially compensated by the first observations Y(n', k') and the part T(n, k') of the second observations Y(n, k) which is related to the average value of interference level induced by on-board interferers is substantially compensated by the first observations Y(n', k').

According to a second embodiment, the first observations of interference and the third observations of interference concern plural portions of the path 170, and the first observations of interference and second observations of interference concern plural journeys over said path 170. The first observations of interference, the second observations of interference and the third observations of interference are here again average values of interference level observed over the corresponding portion of the path 170. The processing device estimates the average value of interference level expected to be encountered by downlink communications between the communication device 131 located inside the moving conveyance 130 and said APs present on said second portion of the path 170, by determining a value eU such that:

$$eU=(eA)F(EU)$$

wherein e is a vector of size equal to NK, with N being the quantity of considered portions of the path 170 (corresponding to the first portions plus the second portion) and K being the quantity of considered journeys (corresponding to the first journeys plus the second journey) over the path 170, such that:

$$e=[1, 0, \ldots, 0]$$

wherein U is a vector of interference that is a concatenation of vectors of interferences level relating to the N portions of the path 170 and to the K journeys, which can be expressed as follows:

$$U=[Y^*(n, k), Y(n-1, k), \ldots, Y(n-N+1, k), Y(n, k-1), \ldots, Y(n-N+1, k-K+1)]^T$$

which means that U is a vector that presents firstly the average value of interference level Y*(n, k) to be estimated, then the observations performed along the K−1 other considered portions of the path 170 during the second journey in inverse order compared to the order in which said portions appear on said path, and then similarly the observations performed along the K considered portions of the path 170 during the first journeys in inverse order compared to the order in which said journeys occurred, and wherein A is a matrix of size equal to NK×(N+K) such that:

$$A = \begin{bmatrix} 1 & 0 & \ldots & 0 & | & 1 & 0 & \ldots & \ldots & 0 \\ 0 & \ddots & \ddots & \vdots & | & \vdots & \vdots & \ldots & \ldots & \vdots \\ \vdots & \ddots & \ddots & 0 & | & \vdots & \vdots & \ldots & \ldots & \vdots \\ 0 & \ldots & 0 & 1 & | & 1 & 0 & \ldots & \ldots & 0 \\ \hline 1 & 0 & \ldots & 0 & | & 0 & 1 & 0 & \ldots & 0 \\ 0 & \ddots & \ddots & \vdots & | & \vdots & \vdots & \vdots & \ldots & \vdots \\ \vdots & \ddots & \ddots & 0 & | & \vdots & \vdots & \vdots & \ldots & \vdots \\ 0 & \ldots & 0 & 1 & | & 0 & 1 & 0 & \ldots & 0 \\ \hline & \vdots & & & | & & \vdots & & & \\ 1 & 0 & \ldots & 0 & | & 0 & \ldots & \ldots & 0 & 1 \\ 0 & \ddots & \ddots & \vdots & | & \vdots & \ldots & \ldots & \vdots & \vdots \\ \vdots & \ddots & \ddots & 0 & | & \vdots & \ldots & \ldots & \vdots & \vdots \\ 0 & \ldots & 0 & 1 & | & 0 & \ldots & \ldots & 0 & 1 \end{bmatrix}$$

which corresponds to an arrangement of two vertical groups of K sub-matrices, the first group in sequence consisting of K identity matrices of size N arranged vertically, the last group in sequence consisting of K sub-matrices of size N×K having a column with ones at the i-th position and columns of zeros elsewhere, wherein i is the value of an index from 1 to K representative of the vertical position of the considered sub-matrix, wherein E is a matrix of size equal to (NK−1)×(NK), as follows:

$$E = \begin{bmatrix} 0 & 1 & 0 & \ldots & 0 \\ 0 & 0 & \ddots & \ddots & \vdots \\ 0 & \vdots & \ddots & \ddots & 0 \\ 0 & 0 & \ldots & 0 & 1 \end{bmatrix}$$

and wherein F is a matrix such that:

$$EAFEU=EU.$$

It can be noted that:

$$U=AV$$

wherein V is a vector of interference that is a concatenation of the vectors of interferences level observed in the N portions of the path 170 during the K journeys, which can be expressed as follows:

$$V=[w(n), w(n-1), \ldots, w(n-N+1), t(k), t(k-1), \ldots, t(k-K+1)]^T$$

wherein w(i), with n−N+1≤i≤n, represents the average value of interference level induced by wayside interferers in the portion i among the K considered portions of the path 170 (considering that said average value of interference level induced by wayside interferers in the portion i doesn't substantially change from one journey to another), and t(j), with k−K+1≤j≤k, represents the average value of interference level induced by on-board interferers during the journey j (considering that said average value of interference level induced by on-board interferers doesn't substantially change during each single journey), which means that V is a vector that presents firstly the average values of interference level induced by wayside interferers along the path 170 in inverse order compared to the order in which said portions appear on said path and then the average values of interference level induced by on-board interferers in inverse order compared to the order in which said journeys occurred.

The matrix F can be obtained during a pre-processing step by minimizing the following over-determined (i.e. the quantity of equations is lower than the quantity of unknowns) least square problem, for example by relying on the Moore-Penrose pseudoinverse:

$$|EAF-I|^2$$

wherein I is an identity matrix.

It is apparent from the definitions above that eU corresponds to the estimation Y* of the average value of interference level expected to be encountered by downlink communications between the communication device 131 located inside the moving conveyance 130 and said APs present on said second portion of the path 170, and that EU corresponds to a collection of the first, second and third observations Y of interference (i.e. EU leads to exclude the estimation Y* of the average value of interference level expected to be encountered by downlink communications between the communication device 131 located inside the moving conveyance 130 and said APs present on said second portion of the path 170). The second embodiment therefore consists in determining eU from EU, and the matrix F provides the best estimation Y* of the average value of interference level expected to be encountered by downlink communications between the communication device 131 located inside the moving conveyance 130 and said APs present on said second portion of the path 170, from the first, second and third observations of interference according to a least square criteria. Therefore, eU is determined from EU, by combining the first, second and third observations of interference in such a way that the part of the third observations which is related to interference induced by wayside interferers is substantially compensated by the first observations and the part of the second observations which is related to interference induced by on-board interferers is substantially compensated by the first observations.

According to a third embodiment, the first observations of interference and the third observations of interference concern plural portions of the path 170, and the first observations of interference and second observations of interference concern plural journeys over said path 170. The first observations of interference, the second observations of interference and the third observations of interference are here again average values of interference level observed over the corresponding portion of the path 170. Before performing interference estimation, the processing device merges all the first observations into a single average value of interference level, merges all the second observations into a single average value of interference level and merges all the third observations into a single average value of interference level. The fingerprint map therefore contains all data to be merged together, and the processing device performs the adequate merging operations when it is needed for performing the interference estimation. This leads to using less computational resources for performing the interference estimation. An algorithm for performing such a merging operation is detailed hereafter with regard to FIG. 5. For merging the first observations into a single value, the processing device can start first by merging the data coming from the various first journeys for each first portion of the path 170, then continue by merging the resulting merged data for all first portions of the path 170 into a single value. In a variant, the processing device starts first by merging the data coming from the first portions of the path 170 for each journey, then continue by merging the resulting merged data for all first journeys into a single value. The processing device applies a same forgetting factor, if any, when merging data coming from the various first journeys into a single value, whatever the merging operation concerns the first observations of interference or the second observations of interference. The processing device also applies a same forgetting factor, if any, when merging data coming from the various first portions into a single value, whatever the merging operation concerns the first observations of interference or the third observations of interference. These merging operations result in acting as if the first observations of interference and the second observations of interference concern a single virtual journey over said path 170, and as if only two portions of the path 170 are considered by the processing device: one virtual first portion and the second portion. The processing device then estimates the average value of interference level expected to be encountered by downlink communications between the communication device 131 located inside the moving conveyance 130 and said APs present on said second portion of the path 170, by adding the merged third observations to the merged second observations and further subtracting the merged first observations. In other words, after having performed the merging operations, it results in performing the first embodiment as described above.

Figure 6:
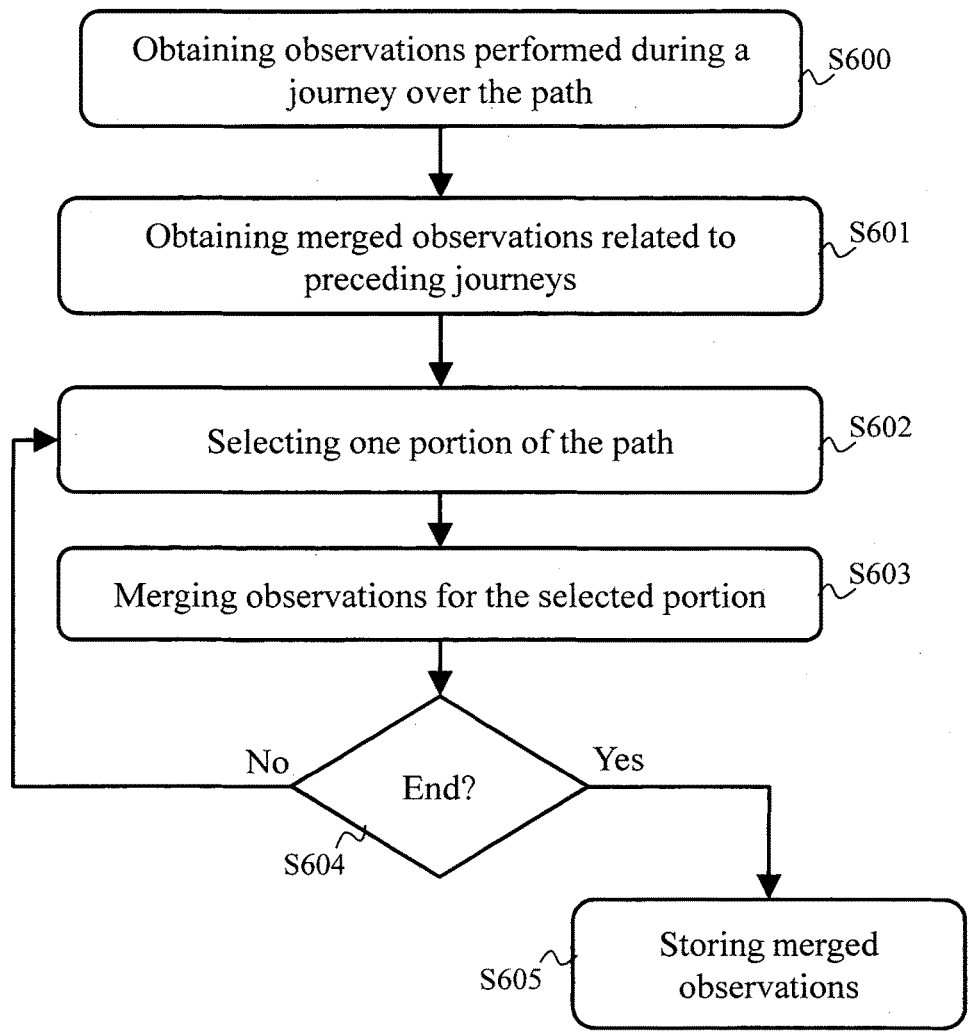
FIG. 6 schematically represents an algorithm for merging observations of interference into a single value, for further storing the merged observations into a fingerprint map.

In a variant, some merging operations are instead performed when updating the fingerprint map, as detailed hereafter with regard to FIG. 6. Such merging operations consist in acting as if a single virtual journey over said path 170 was previously performed, which leads to storing only a single value (i.e. a merged value) of observations of interference for each portion of the path 170. The merging operation consists in obtaining, for each portion of the path 170, an average value between the observations to be added to the fingerprint map and the (merged) value previously stored in the fingerprint map. The amount of storage resources needed to store the observations of interference is thus reduced. Before performing interference estimation, the processing device may further merge all the first observations into a single average value of interference level and all the third observations into a single average value of interference level, which then leads to performing the first embodiment as described above.

According to a fourth embodiment, the first observations of interference and the third observations of interference concern one portion of the path 170, and the first observations of interference and the second observations of interference concern a single journey over said path 170. Only two portions of the path 170 are therefore considered by the processing device: the first portion and the second portion. Moreover, the first observations of interference, the second observations of interference and the third observations of interference are histograms representative of interference probability density functions. The interference to be estimated is also an histogram representative of an interference probability density function. This approach allows determining quantiles of the interference distribution, which can be extracted from the corresponding interference probability density function, or histograms thereof in the discrete case. In order to ease computation, characteristic functions ψ of interference, which are the Fourier transform of said interference probability density functions, are used. Considering that the interference induced by wayside interferers on each portion of the path 170 substantially has a static distribution from one journey to another, and further considering that the interference induced by on-board interferers substantially has a static distribution during a single journey, the following relationship can be expressed:

$$\psi^*_{n,k}(jv) \approx \frac{\psi_{n,k'}(jv)\psi_{n',k}(jv)}{\psi_{n',k'}(jv)}$$

wherein $\psi^*_{n,k}(jv)$ represents an estimation of the characteristic function of the interference expected to be encountered by downlink communications between the communication device 131 located inside the moving conveyance 130 and said APs present on said second portion of the path 170, wherein $\psi_{n,k}(jv)$ represents the second observations of interference in the form of a characteristic function of interference, wherein $\psi_{n',k}(jv)$ represents the third observations of interference in the form of a characteristic function of interference, wherein $\psi_{n',k'}(jv)$ represents the first observations of interference in the form of a characteristic function of interference, and wherein jv represents the frequency domain variable associated to the Fourier transform operation.

The expression above can be derived in the discrete domain as follows:

$$\psi^*_{n,k}(l) \approx \frac{\psi_{n,k'}(l)\psi_{n',k}(l)}{\psi_{n',k'}(l)}$$

wherein l represents a frequency index.

It can be noticed that the expressions above can also be respectively formulated as follows:

$$\log(\psi^*_{n,k}(jv)) \approx \log(\psi_{n,k'}(jv)) + \log(\psi_{n',k}(jv)) - \log(\psi_{n',k'}(jv))$$

$$\log(\psi^*_{n,k}(l)) \approx \log(\psi_{n,k'}(l)) + \log(\psi_{n',k}(l)) - \log(\psi_{n',k'}(l))$$

which avoids performing divisions during computations of the interference estimation $\psi_{n,k}$.

Therefore, the fingerprint map stores histograms of observations of interference for each portion of the path 170 and the processing device applies a Discrete Fourier Transform operation to each histogram in order to obtain a discrete version of the characteristic function ψ. Then the processing device determines the estimation $\psi^*_{n,k}$ of the characteristic function $\psi_{n,k}$ on a per frequency basis (i.e. independent computation of $\psi^*_{n,k}(l)$ for each value of the frequency index l). Then, by applying an Inverse Discrete Fourier Transform operation, the processing device obtains, in the form of an histogram corresponding to the estimation $\psi^*_{n,k}$ of the characteristic function $\psi_{n,k}$, the estimation of the interference expected to be encountered by downlink communications between the communication device 131 located inside the moving conveyance 130 and said APs present on said second portion of the path 170.

The frequency index l is related to the normalized frequency l/M, as defined by the use of the Discrete Fourier Transform, where M is the quantity of bins of the histogram and of subdivisions of the frequency spectrum, wherein these subdivisions uniformly divide the frequency spectrum from 0 to MD, wherein MD is the frequency width related to the inverse of the width of each bin of the histogram.

According to a fifth embodiment, the first observations of interference and the third observations of interference concern one portion of the path 170, and the first observations of interference and the second observations of interference concern a single journey over said path 170. Only two portions of the path 170 are therefore considered by the processing device: the first portion and the second portion. Moreover, the first observations of interference, the second observations of interference and the third observations of interference are the characteristic functions ψ of interference mentioned above. Therefore, the fingerprint map stores the characteristic function ψ of interference for each portion of the path 170, on a per frequency basis (i.e. for each value of the frequency index l). Then the processing device determines the estimation $\psi^*_{n,k}$ of the characteristic function $\psi_{n,k}$ on a per frequency basis (i.e. computation of $\psi^*_{n,k}(l)$ for each value of the frequency index l). Therefore, the processing device obtains, in the form of an estimation $\psi^*_{n,k}$ of a characteristic function ψ, the estimation of the interference expected to be encountered by downlink communications between the communication device 131 located inside the moving conveyance 130 and said APs present on said second portion of the path 170.

According to a sixth embodiment, the first observations of interference and the third observations of interference concern plural portions of the path 170, and the first observations of interference and second observations of interference concern plural journeys over said path 170. The first observations of interference, the second observations of interference and the third observations of interference are histograms representative of interference probability density functions. The interference to be estimated is also an histogram representative of an interference probability density function. Before performing interference estimation, the processing device merges all the first observations into a single histogram of interference, merges all the second observations into a single histogram of interference and merges all the third observations into a single histogram of interference. The fingerprint map therefore contains all histogram data to be merged together, and the processing device performs the adequate merging operations when it is needed for performing the interference estimation. This leads to using less computational resources for performing the interference estimation. An algorithm for performing such a merging operation is detailed hereafter with regard to FIG. 7. For merging the first observations into a single histogram, the processing device can start first by merging the data coming from the various first journeys for each first portion of the path 170, then continue by merging the resulting merged data for all first portions of the path 170 into a single histogram. In a variant, the processing device starts first by merging the data coming from the first portions of the path 170 for each journey, then continue by merging the resulting merged data for all first journeys into a single histogram. The processing device applies a same forgetting factor, if any, when merging data coming from the various first journeys into a single histogram, whatever the merging operation concerns the first observations of interference or the second observations of interference. The processing device also applies a same forgetting factor, if any, when merging data coming from the various first portions into a single histogram, whatever the merging operation concerns the first observations of interference or the third observations of interference. These merging operations result in acting as if the first observations of interference and the second observations of interference concern a single virtual journey over said path 170, and as if only two portions of the path 170 be considered by the processing device: one virtual first portion and the second portion. The processing device then estimates the histogram representative of the probability density function of the interference expected to be encountered by downlink communications between the communication device 131 located inside the moving conveyance 130 and said APs present on said second portion of the path 170. To do so, the processing device applies a Discrete Fourier Transform operation to each histogram in order to obtain a discrete version of the characteristic function $\psi$. Then the processing device determines the estimation $\psi^*_{n,k}$ of the characteristic function $\psi_{n,k}$ on a per frequency basis (i.e. computation of $\psi^*_{n,k}$ (l) for each value of the frequency index l). Then, by applying an Inverse Discrete Fourier Transform operation, the processing device obtains, in the form of an histogram corresponding to the estimation $\psi^*_{n,k}$ the characteristic function $\psi_{n,k}$, the estimation of the interference expected to be encountered by downlink communications between the communication device 131 located inside the moving conveyance 130 and said APs present on said second portion of the path 170. In other words, after having performed the merging operations, it results in performing the fourth embodiment as described above.

Figure 8:
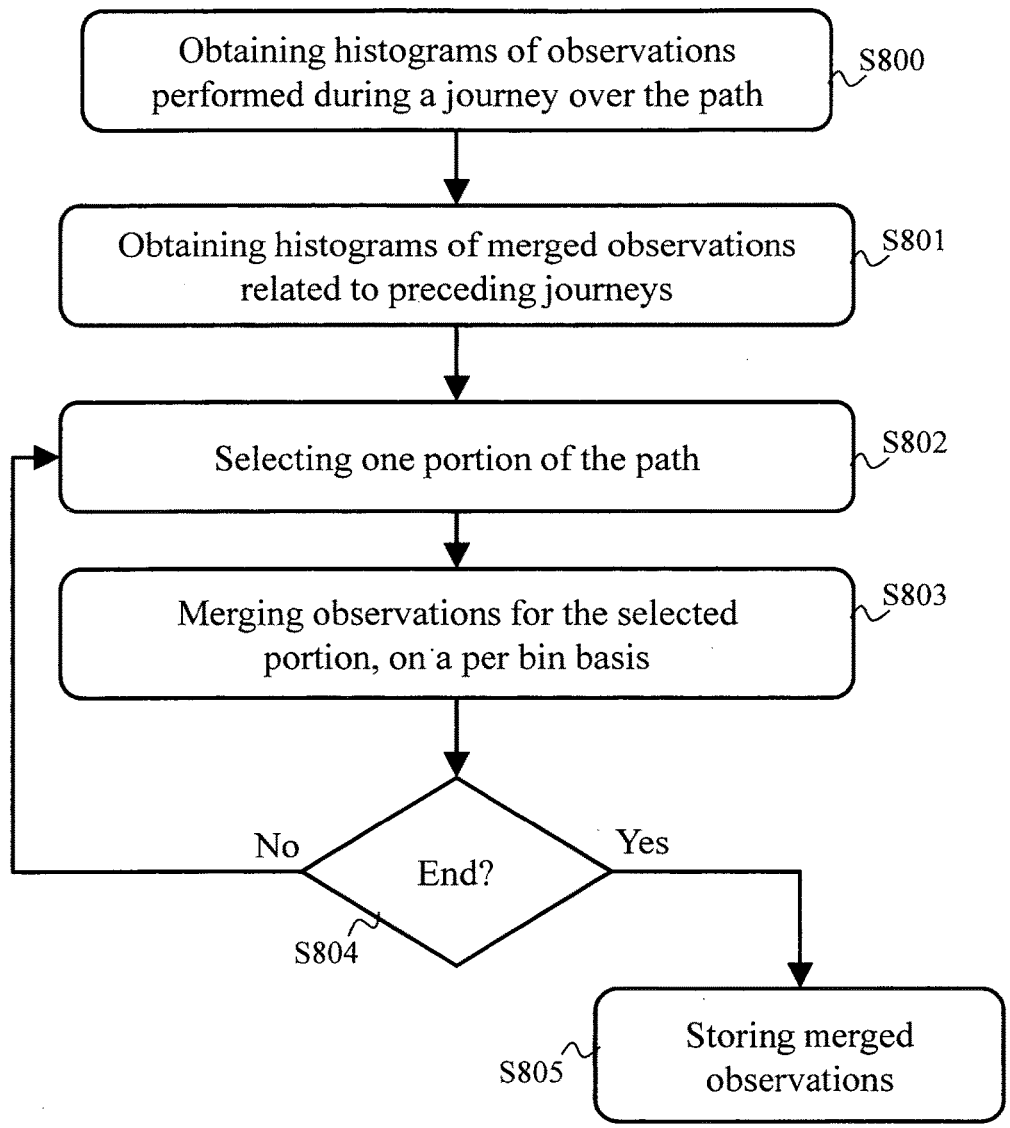
FIG. 8 schematically represents an algorithm for merging observations of interference into a single histogram, for further storing the merged observations into a fingerprint map.

In a variant, some merging operations are instead performed when updating the fingerprint map, as detailed hereafter with regard to FIG. 8. Such merging operations consist in acting as if a single virtual journey over said path 170 was previously performed, which leads to storing only a single histogram (i.e. a merged histogram) representative of the interference probability density function for each portion of the path 170. The amount of storage resources needed to store the observations of interference is thus reduced. Before performing interference estimation, the processing device may further merge all the first observations into a single histogram and all the third observations into a single histogram, which then leads to performing the fourth embodiment as described above.

According to a seventh embodiment, the first observations of interference and the third observations of interference concern plural portions of the path 170, and the first observations of interference and second observations of interference concern plural journeys over said path 170. Moreover, the first observations of interference, the second observations of interference and the third observations of interference are the characteristic functions $\psi$ of interference mentioned above. Therefore, the fingerprint map stores the characteristic function $\psi$ of interference for each portion of the path 170, on a per frequency basis (i.e. for each value of the frequency index l). The interference to be estimated is also a characteristic function $\psi$ of interference. Before performing interference estimation, the processing device merges all the first observations into a single characteristic function $\psi$ of interference, merges all the second observations into a single characteristic function $\psi$ of interference and merges all the third observations into a single characteristic function $\psi$ of interference. The fingerprint map therefore contains all characteristic functions $\psi$ data to be merged together, and the processing device performs the adequate merging operations when it is needed for performing the interference estimation. This leads to using less computational resources for performing the interference estimation. An algorithm for performing such a merging operation is detailed hereafter with regard to FIG. 9. For merging the first observations into a single characteristic function $\psi$ of interference, the processing device can start first by merging the data coming from the various first journeys for each first portion of the path 170, then continue by merging the resulting merged data for all first portions of the path 170 into a single characteristic function $\psi$ of interference. In a variant, the processing device starts first by merging the data coming from the first portions of the path 170 for each journey, then continue by merging the resulting merged data for all first journeys into a single characteristic function $\psi$ of interference. The processing device applies a same forgetting factor, if any, when merging data coming from the various first journeys into a single characteristic function $\psi$ of interference, whatever the merging operation concerns the first observations of interference or the second observations of interference. The processing device also applies a same forgetting factor, if any, when merging data coming from the various first portions into a single characteristic function $\psi$ of interference, whatever the merging operation concerns the first observations of interference or the third observations of interference. These merging operations result in acting as if the first observations of interference and the second observations of interference concern a single virtual journey over said path 170, and as if only two portions of the path 170 be considered by the processing device: one virtual first portion and the second portion. The processing device then estimates the characteristic function $\psi$ of the interference expected to be encountered by downlink communications between the communication device 131 located inside the moving conveyance 130 and said APs present on said second portion of the path 170, by using the already mentioned formula in the discrete domain. After having performed the merging operations, it results in performing the fifth embodiment as described above.

Figure 10:
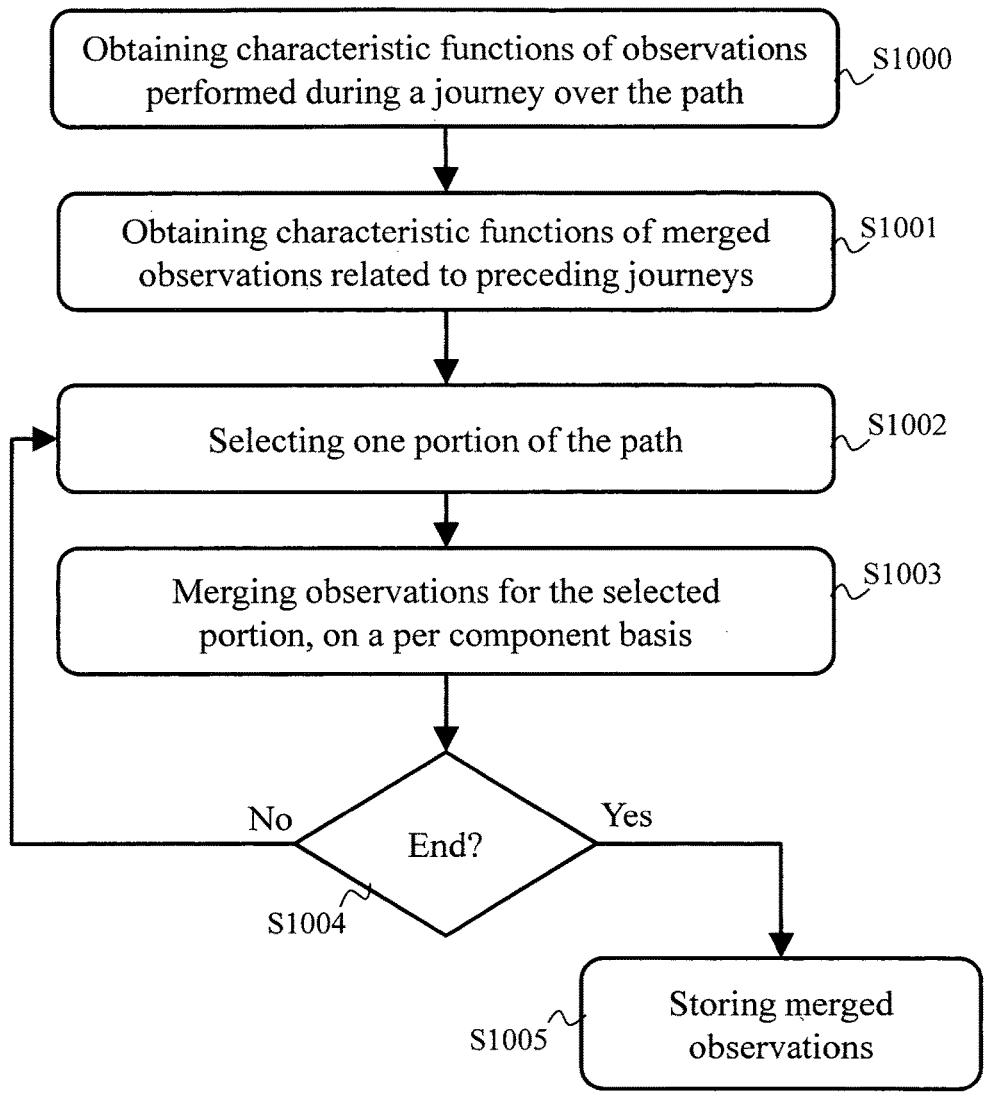
FIG. 10 schematically represents an algorithm for merging observations of interference into a single characteristic function of interference, for further storing the merged observations into a fingerprint map.

In a variant, some merging operations are instead performed when updating the fingerprint map, as detailed hereafter with regard to FIG. 10. Such merging operations consist in acting as if a single virtual journey over said path 170 was previously performed, which leads to storing only a single characteristic function $\psi$ of interference for each portion of the path 170. The amount of storage resources needed to store the observations of interference is thus reduced. Before performing interference estimation, the processing device may further merge all the first observations into a single characteristic function $\psi$ of interference and all the third observations into a single characteristic function $\psi$ of interference, which then leads to performing the fifth embodiment as described above.

According to a particular embodiment, when the first observations of interference and the third observations of interference concern plural portions of the path 170, the first portions of the path 170 to be taken into account for estimating the interference expected to be encountered by downlink communications between the communication device 131 located inside the moving conveyance 130 and said APs present on said second portion of the path 170 are consecutive portions of the path 170. Preferably, the second portion of the path 170 is the portion that immediately follows, on the path 170, the last first portion in sequence.

FIGS. 4A to 4G schematically represent configurations of the wireless telecommunications system of FIG. 1 for implementing the present invention, in which a fingerprint map 401 stores historical data regarding observations of interference performed during journeys along the path 170. FIGS. 4A to 4G show the server 100, the communication device 131 located in the moving conveyance 130, as well as the AP 110. The processing device has reference 402 in FIGS. 4A to 4G. The configuration is duplicated for the other APs of the wireless telecommunications system.

Figures 4A, 4B:
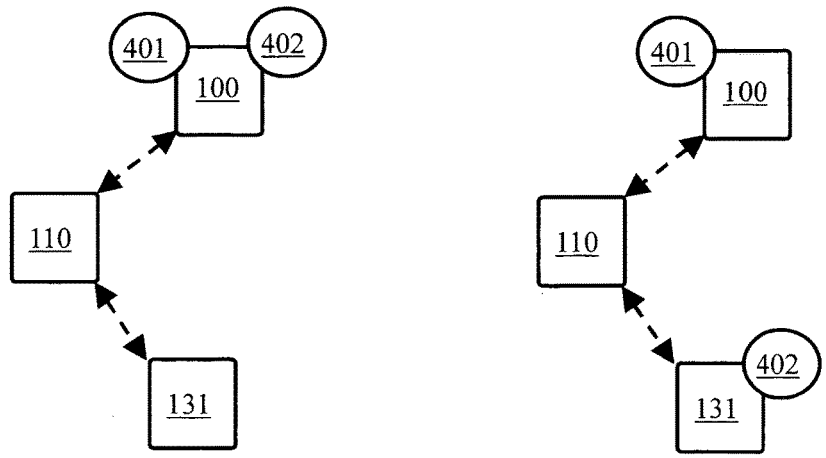
FIG. 4A schematically represents configurations of the wireless telecommunications system for implementing the present invention.
FIG. 4B schematically represents configurations of the wireless telecommunications system for implementing the present invention.

FIG. 4A schematically represents a first configuration. In this configuration, the processing device 402 is located in, or connected to, the server 100. The fingerprint map 401 is also located in, or connected to, the server 100. In this configuration, the server 100 receives, via the AP 110, from the communication device (such as the communication device 131) located in the considered moving conveyance (such as the moving conveyance 130) observations of interference performed by said communication device during the journey of the considered moving conveyance over the path 170. This allows the server 100 to update later on the fingerprint map 401. The server 100 is then able to provide the first observations of interference, the second observations of interference and the third observations of interference to the processing device 402.

FIG. 4B schematically represents a second configuration. In this configuration, the processing device 402 is located in, or connected to, the communication device 131 located in the moving conveyance 130. The fingerprint map 401 is located in, or connected to, the server 100. In this configuration, the server 100 receives, via the AP 110, from the communication device (such as the communication device 131) located in the considered moving conveyance (such as the moving conveyance 130) observations of interference performed by the communication device during the journey of the considered moving conveyance over the path 170. This allows the server 100 to update later the fingerprint map 401. The server 100 is then able to provide, via the AP 110, the first observations of interference and the second observations of interference to the communication device 131, which in turn provides them to the processing device 402. The communication device 131 is moreover able to provide the third observations of interference to the processing device 402.

FIG. 4C schematically represents a third configuration. In this configuration, the processing device 402 is located in, or connected to, the AP 110. The fingerprint map 401 is also located in, or connected to, the AP 110. In this configuration, the AP 110 receives from the communication device (such as the communication device 131) located in the considered moving conveyance (such as the moving conveyance 130) observations of interference performed by the communication device during the journey of the considered moving conveyance over the path 170. APs of the wireless telecommunications system preferably shares the observations of interference thus received, such that all APs have the same contents of fingerprint map 401. This allows the AP 110 to update later on the fingerprint map 401. The AP 110 is then able to provide the first observations of interference, the second observations of interference and the third observations of interference to the processing device 402.

FIG. 4D schematically represents a fourth configuration. In this configuration, the processing device 402 is located in, or connected to, the AP 110. The fingerprint map 401 of interference is located in, or connected to, the server 100. A partial fingerprint map 403 of interference is located in, or connected to, the AP 110. This partial fingerprint map 403 of interference corresponds to a part of the fingerprint map 401 useful for the processing device 402 to perform interference estimation when the communication device located in the considered moving conveyance is in the vicinity of the AP 110. In this configuration, the server 100 receives, via the AP 110, from the communication device (such as the communication device 131) located in the considered moving conveyance (such as the moving conveyance 130) observations of interference performed by the communication device during the journey of the considered moving conveyance over the path 170. The server 100 is then able to update later on the fingerprint map 401. The server 100 is then able to provide to the AP 110 the first observations of interference and the second observations of interference useful for the processing device 402 to perform interference estimation when the communication device located in the considered moving conveyance is in the vicinity of the AP 110. The AP 110 is then able to provide to the processing device 402 the first observations of interference, the second observations of interference and the third observations of interference.

FIG. 4E schematically represents a fifth configuration. In this configuration, the processing device 402 is located in, or connected to, the communication device 131 located in the moving conveyance 130. The fingerprint map 401 is located in, or connected to, the AP 110. In this configuration, the AP 110 receives from a communication device (such as the communication device 131) located in the considered moving conveyance (such as the moving conveyance 130) observations of interference performed by the communication device during the journey of the considered moving conveyance over the path 170. APs of the wireless telecommunications system preferably shares the observations of interference thus received, such that all APs have the same contents of fingerprint map 401. This allows the AP 110 to update later on the fingerprint map 401. The AP 110 is then able to provide the first observations of interference and the second observations of interference to the communication device 131, which in turn provides them to the processing device 402. The communication device 131 is moreover able to provide the third observations of interference to the processing device 402.

FIG. 4F schematically represents a sixth configuration. In this configuration, the processing device 402 is located in, or connected to, the communication device 131 located in the moving conveyance 130. The fingerprint map 401 is located in, or connected to, the server 100. The partial fingerprint map 403 already mentioned is located in, or connected to, the AP 110. This partial fingerprint map 403 of interference corresponds to a part of the fingerprint map 401 useful for the processing device 402 to perform interference estimation when the communication device located in the considered moving conveyance is in the vicinity of the AP 110. In this configuration, the server 100 receives, via the AP 110, from the communication device (such as the communication device 131) located in the considered moving conveyance (such as the moving conveyance 130) observations of interference performed by the communication device during the journey of the considered moving conveyance over the path 170. The server 100 is then able to update later on the fingerprint map 401. The server 100 is then able to provide to the AP 110 the first observations of interference and the second observations of interference useful for the processing device 402 to perform interference estimation when the communication device located in the considered moving conveyance is in the vicinity of the AP 110. The AP 110 is then able to provide to the processing device 402, via the communication device 131, the first observations of interference and the second observations of interference. The communication device 131 is moreover able to provide the third observations of interference to the processing device 402.

Figure 4G:
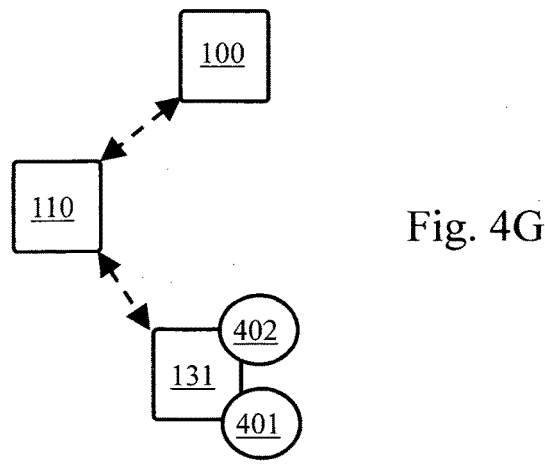
FIG. 4G schematically represents configurations of the wireless telecommunications system for implementing the present invention.

FIG. 4G schematically represents a seventh configuration. In this configuration, the processing device 402 is located in, or connected to, the communication device 131 located in the moving conveyance 130. The fingerprint map 401 is also located in, or connected to, the communication device 131 located in the moving conveyance 130. The communication device 131 is then able to update the fingerprint map 401 according to observations of interference performed by the communication device during the journey of the considered moving conveyance over the path 170. The communication device 131 is then able to provide to the processing device 402 the first observations of interference, the second observations of interference and the third observations of interference.

As mentioned with regard to FIGS. 4A to 4G, the gathering of the interference observations performed during a journey along the path 170 can be performed during said journey, using the wireless telecommunication system infrastructure. Update of the fingerprint map 401 can therefore be performed so that an updated version of the fingerprint map 401 is available for an upcoming journey of a moving conveyance along said path 170. The update of the fingerprint map to take into account new observations performed during a journey on the path 170 can thus be performed at the end of said journey, i.e. after having gathered the observations pertaining to the last portion of the path 170. The update of the fingerprint map can, in a variant, be performed during said journey subject to the constraint that the fingerprint map content for a considered portion of the path can be updated only when said considered portion is no more concerned by any interference estimation remaining to be performed during said journey.

Alternatively, the gathering of the interference observations may be performed via data storage portable means, such as a USB (Universal Serial Bus) flash drive, that is firstly plugged to the communication device (such as the communication device 131) located in the considered moving conveyance for transferring to the USB flash drive data stored in a database during the journey of the considered moving conveyance on the path 170, and that is secondly plugged to the device(s) implementing the fingerprint map 401 (i.e. the server 100, or the APs, or the communication device (such as the communication device 131) located in the next moving conveyance having to perform a journey on the path 170) for transferring thereto the data stored by the USB flash drive. Update of the fingerprint map 401 can therefore be performed at the end of the journey, so that an updated version of the fingerprint map 401 is available for an upcoming journey of a moving conveyance along said path 170.

As already mentioned the fingerprint map 401 may store the observations of interference performed during each journey over the path 170 for each portion of the path 170. In a variant, some merging operations may also be performed when updating the fingerprint map, in order to only keep one averaged interference level, or one averaged interference histogram, or one average interference characteristic function for each portion of the path 170, as respectively detailed hereafter with regard to FIGS. 6, 8 and 10 (i.e. as if observations of interference performed during one preceding journey over the path 170 were only available).

Figure 5:
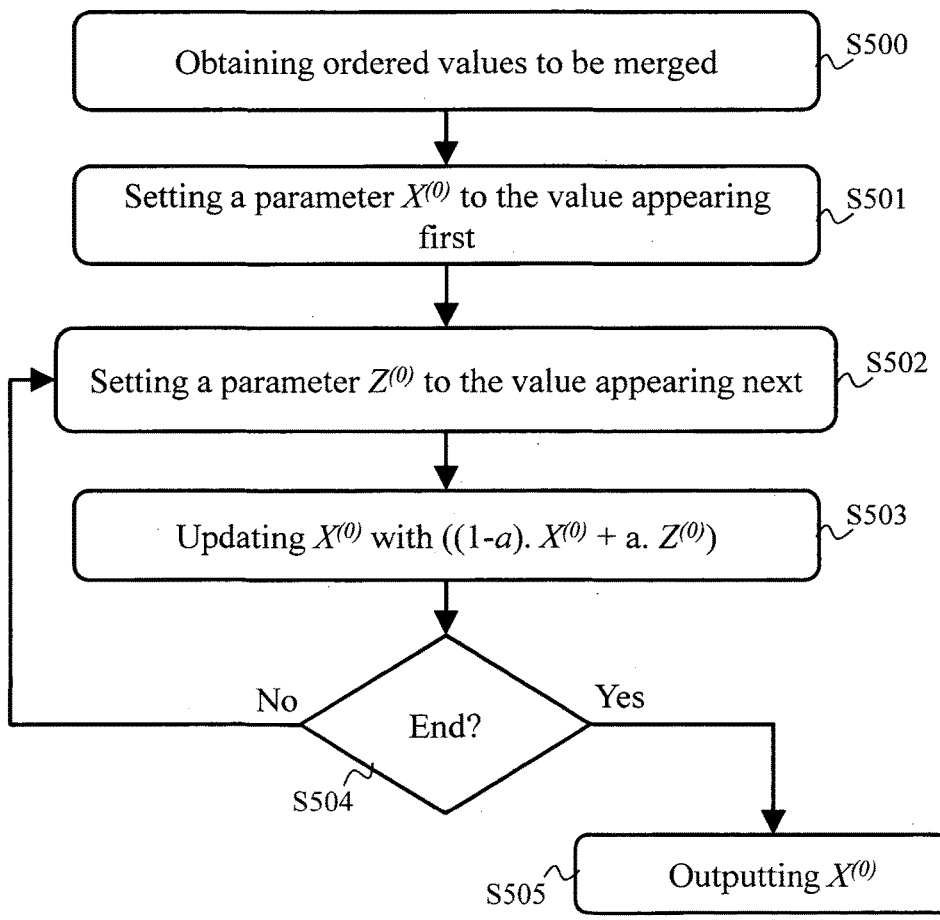
FIG. 5 schematically represents an algorithm for merging plural stored observations of interference into a single value, when performing interference estimation.

FIG. 5 schematically represents an algorithm for merging plural observations of interference, in the form of average levels of interference, into a single (merged) value. The algorithm of FIG. 5 is performed by the processing device.

In a step S500, the processing device obtains ordered values to be merged. When the merging operation concerns observations of interference for a single portion of the path 170 obtained during plural journeys, the values are presented in the same order as said journeys were executed. When the merging operation concerns observations of interference for plural portions of the path 170 obtained during a single journey, the values are presented in the same order as said portions appear on the path 170.

In a following step S501, the processing device sets a parameter $X^{(o)}$ to the value of observations of interference appearing first (oldest value among the ordered values).

In a following step S502, the processing device sets a parameter $Z^{(o)}$ to the value of observations of interference appearing next according to the order in which the values are presented in the step S500.

In a following step S503, the processing device updates the parameter $X^{(o)}$ with the following expression:

$$(1-a) \cdot X^{(o)} + a \cdot Z^{(o)}$$

where a is a predefined forgetting factor such that a<1 and preferably such that a>0.5.

In a following step S504, the processing device checks whether all the values obtained in the step S500 have been merged into the parameter $X^{(o)}$. If this is the case, a step S505 is performed; otherwise, the step S502 is repeated by setting the parameter $Z^{(o)}$ to the next value in order of appearance (according to the order in which the values were ordered in the step S500).

In the step S505, the processing device outputs the parameter $X^{(o)}$, which is the result of the merging operation applied to the values obtained in the step S500 so as to obtain a single value.

The algorithm of FIG. 5 is therefore adapted to average, with forgetting factor, values of observations of interference. Another approach is to obtain arithmetic mean of the observations of interference, i.e. summing the values of observations of interference and dividing the resulting total by the quantity of summed values.

FIG. 6 schematically represents an algorithm for merging observations of interference, in the form of average levels of interference, when updating the fingerprint map. The algorithm of FIG. 6 is performed by the device of the wireless telecommunication system which is in charge of implementing the fingerprint map. Let's illustratively consider that the algorithm of FIG. 6 is performed by the processing device (i.e. the fingerprint map is co-localized with the processing device).

In a step S600, the processing device obtains observations of interference performed during a journey of a moving conveyance over the path 170. Said observations of interference have been performed for a each portion of the path 170. Said observations of interference have to be merged, if any, with observations of interference related to at least one previous journey over the path 170. When no observations of interference related to at least one previous journey over the path 170 are available, the processing device stores in the fingerprint map the observations of interference obtained in the step S600 and ends the algorithm of FIG. 6.

In a following step S601, the processing device obtains the observations of interference related to at least one previous journey over the path 170, as previously stored in the fingerprint map. When said observations of interference are representative of plural journeys over the path 170, said observations of interference consist of a single merged value for each portion of the path 170.

In a following step S602, the processing device selects one portion of the path 170.

In a following step S603, the processing device merges the observations of interference obtained in the step S600 for said selected portion of the path 170 with the observations of interference obtained in the step S601 for said selected portion of the path 170, in order to obtain an average value of observations of interference for the selected portion of the path 170. The merging operation is preferably performed according to the following expression:

$$(1-b) \cdot X^{(1)} + b \cdot Z^{(1)}$$

wherein b is a predefined forgetting factor such that b<1 and preferably such that b>0.5, wherein $X^{(1)}$ represents the observations of interference obtained in the step S601 for said selected portion of the path 170 and $Z^{(1)}$ represents the observations of interference obtained in the step S600 for said selected portion of the path 170.

In a following step S604, the processing device checks whether the observations of interference for all the portions of the path 170 have been considered. When at least one other portion of the path 170 still has to be considered, the step S602 is repeated by selecting one portion of the path 170 that still has to be considered; otherwise, a step S605 is performed.

In the step S605, the processing device stores the merged values obtained during the execution of the step S603. The stored values are then intended to be used by the processing device to obtain the first observations of interference and the second observations of interference when having to perform interference estimation during an upcoming journey of a moving conveyance over the path 170.

Figure 7:
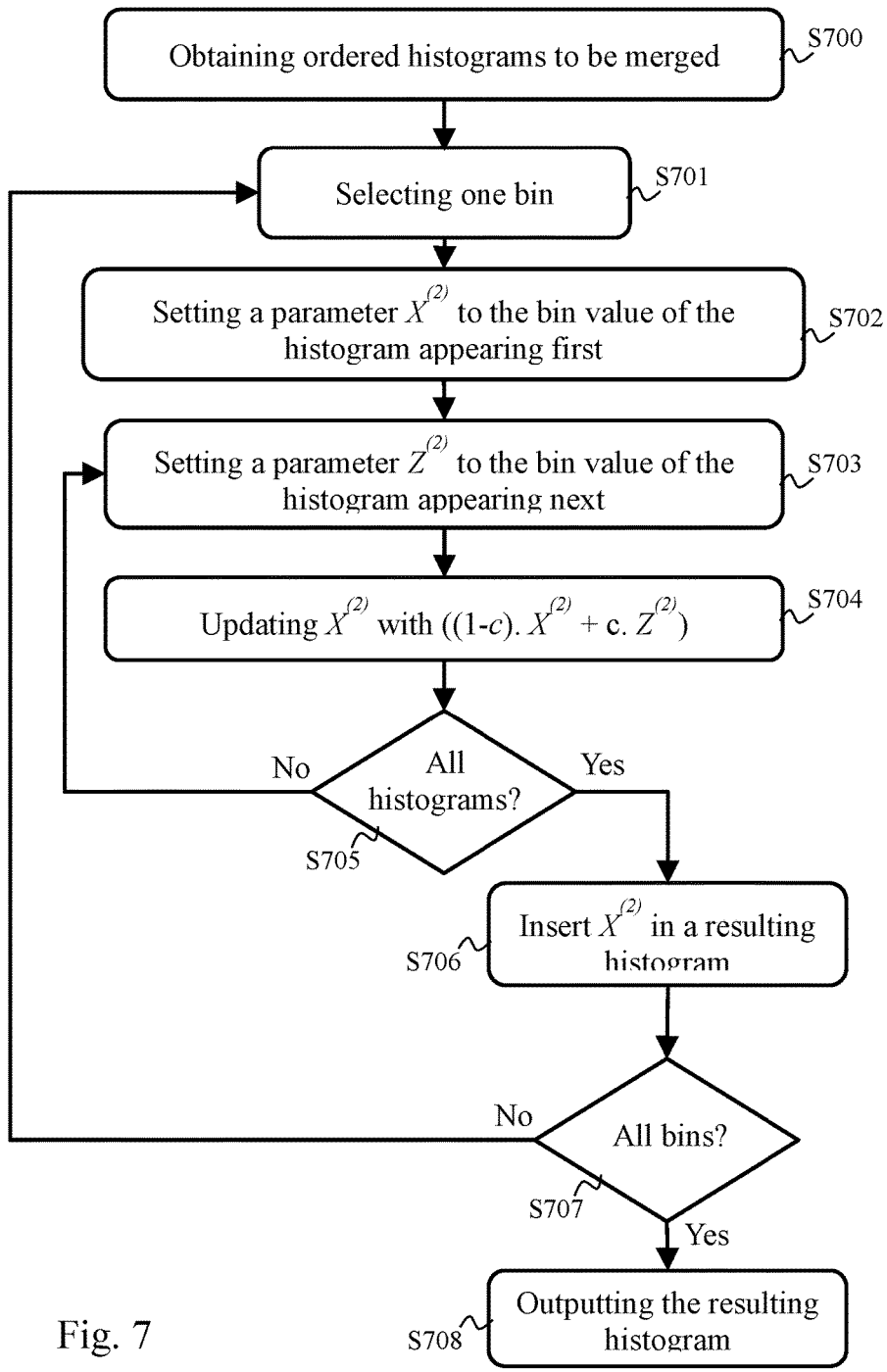
FIG. 7 schematically represents an algorithm for merging plural stored observations of interference into a single histogram, when performing interference estimation.

FIG. 7 schematically represents an algorithm for merging plural observations of interference, in the form of respective histograms, into a single (merged) histogram. The algorithm of FIG. 7 is performed by the processing device.

In a step S700, the processing device obtains ordered histograms to be merged. When the merging operation concerns observations of interference for a single portion of the path 170 obtained during plural journeys, the histograms are presented in the same order as said journeys were executed. When the merging operation concerns observations of interference for plural portions of the path 170 obtained during a single journey, the histograms are presented in the same order as said portions appear on the path 170.

In a following step S701, the processing device selects one bin among the bins present in the ordered histograms.

In a following step S702, the processing device sets a parameter $X^{(2)}$ to the value of the selected bin from the histogram appearing first (oldest histogram among the ordered histograms).

In a following step S703, the processing device sets a parameter $Z^{(2)}$ to the value of the selected bin from the histogram appearing next according to the order in which the histograms are presented in the step S700.

In a following step S704, the processing device updates the parameter $X^{(2)}$ with the following expression:

$$(1-c) \cdot X^{(2)} + c \cdot Z^{(2)}$$

where c is a predefined forgetting factor such that c<1 and preferably such that c>0.5.

In a following step S705, the processing device checks whether all the histograms obtained in the step S700 have been considered for the selected bin. If this is the case, a step S706 is performed; otherwise, the step S703 is repeated by setting the parameter $Z^{(2)}$ to the value of the selected bin from the next histogram in order of appearance (according to the order in which the histograms were ordered in the step S700).

In the step S706, the processing device inserts the value of the parameter $X^{(2)}$ in a resulting histogram, the parameter $X^{(2)}$ defining the value of the selected bin in the resulting histogram.

In a following step S707, the processing device checks whether all the bins present in the histograms obtained in the step S700 have been considered. If this is the case, a step S708 is performed; otherwise, the step S701 is repeated by selecting another bin to be considered for performing the merging operation.

In the step S708, the processing device outputs the histogram resulting from the merging operation.

The algorithm of FIG. 7 is therefore adapted to average, with forgetting factor, the histograms on a per bin basis. Another approach is to merge the histograms by using the arithmetic mean for each bin, i.e. for each bin, summing the values of said bin of the histograms and dividing the resulting total by the quantity of histograms.

FIG. 8 schematically represents an algorithm for merging observations of interference, in the form of respective histograms, when updating the fingerprint map. The algorithm of FIG. 8 is performed by the device of the wireless telecommunication system which is in charge of implementing the fingerprint map. Let's illustratively consider that the algorithm of FIG. 8 is performed by the processing device (i.e. the fingerprint map is co-localized with the processing device).

In a step S800, the processing device obtains observations of interference, in the form of histograms, which have been performed during a journey of a moving conveyance over the path 170. Said observations of interference have been performed for a each portion of the path 170. Said observations of interference have to be merged, if any, with observations of interference related to at least one previous journey over the path 170. When no observations of interference related to at least one previous journey over the path 170 are available, the processing device stores in the fingerprint map the observations of interference obtained in the form of histograms in the step S800 and ends the algorithm of FIG. 8.

In a following step S801, the processing device obtains the observations of interference, in the form of histograms, which are related to at least one previous journey over the path 170, as previously stored in the fingerprint map. When said observations of interference are representative of plural journeys over the path 170, said observations of interference consist of a single merged histogram for each portion of the path 170.

In a following step S802, the processing device selects one portion of the path 170.

In a following step S803, the processing device merges the observations of interference obtained in the step S800 for said selected portion of the path 170 with the observations of interference obtained in the step S801 for said selected portion of the path 170. The merging operation is performed on a per bin basis. The merging operation is preferably performed according to the following expression:

$$(1-d) \cdot X^{(3)} + d \cdot Z^{(3)}$$

wherein d is a predefined forgetting factor such that d<1 and preferably such that d>0.5, wherein $X^{(3)}$ represents the observations of interference obtained in the step S801 for said selected portion of the path 170 and $Z^{(3)}$ represents the observations of interference obtained in the step S800 for said selected portion of the path 170.

In a following step S804, the processing device checks whether the observations of interference for all the portions of the path 170 have been considered. When at least one other portion of the path 170 still has to be considered, the step S802 is repeated by selecting one portion of the path 170 that still has to be considered; otherwise, a step S805 is performed.

In the step S805, the processing device stores in the fingerprint map the merged histograms obtained during the execution of the step S803. The stored values are then intended to be used by the processing device to obtain the first observations of interference and the second observations of interference when having to perform interference estimation during an upcoming journey of a moving conveyance over the path 170.

Figure 9:
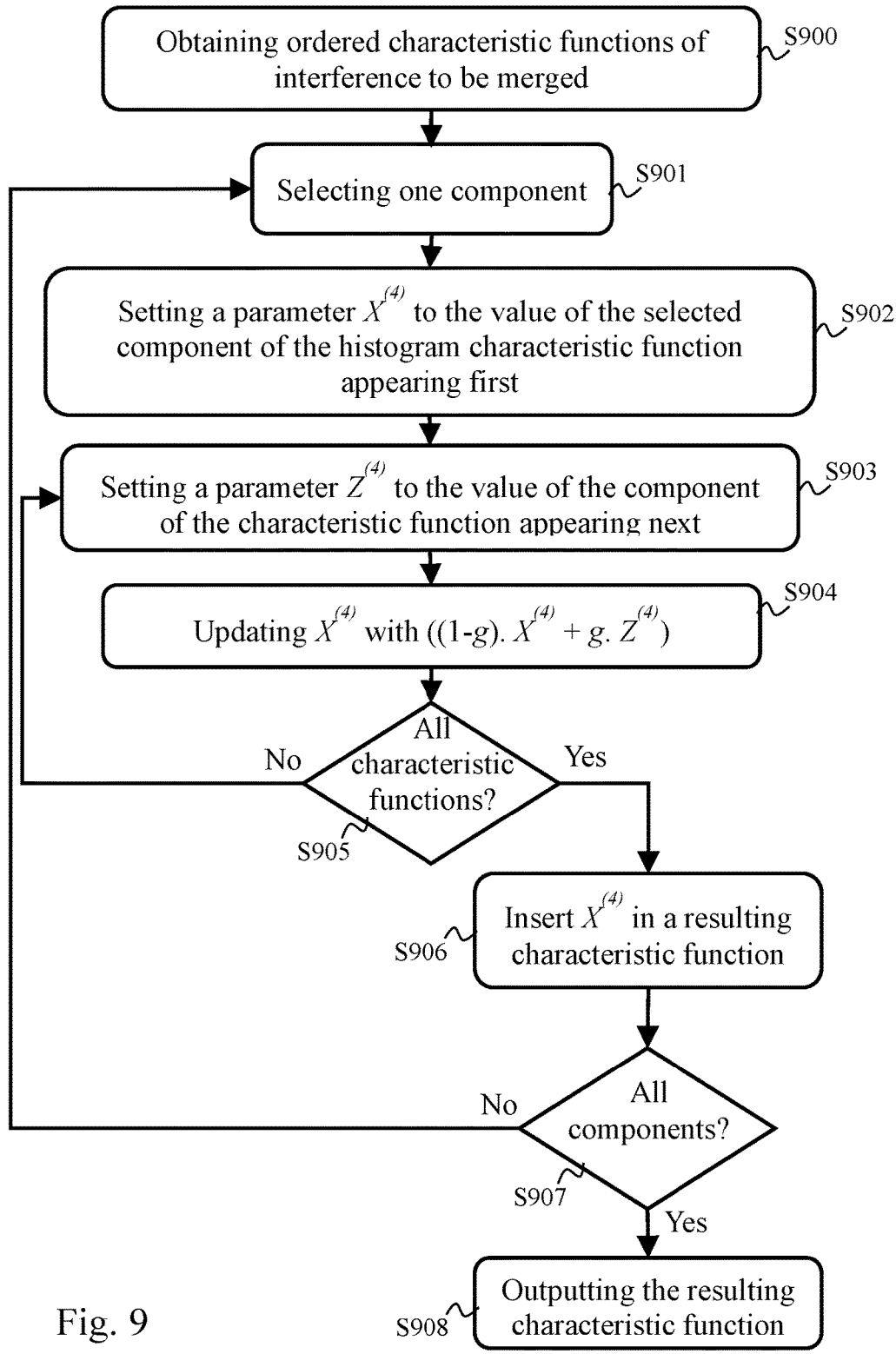
FIG. 9 schematically represents an algorithm for merging plural stored observations of interference into a single characteristic function of interference, when performing interference estimation.

FIG. 9 schematically represents an algorithm for merging plural observations of interference, in the form of characteristic functions $\psi$ of interference, into a single (merged) characteristic function of interference. The algorithm of FIG. 9 is performed by the processing device.

In a step S900, the processing device obtains ordered characteristic function $\psi$ of interference to be merged. When the merging operation concerns observations of interference for a single portion of the path 170 obtained during plural journeys, the characteristic functions $\psi$ of interference are presented in the same order as said journeys were executed. When the merging operation concerns observations of interference for plural portions of the path 170 obtained during a single journey, the characteristic functions $\psi$ of interference are presented in the same order as said portions appear on the path 170.

In a following step S901, the processing device selects one component (i.e. one value of the frequency index/mentioned with regard to FIG. 3) among the components present in the ordered characteristic functions $\psi$ of interference (among all possible values of said frequency index l).

In a following step S902, the processing device sets a parameter $X^{(4)}$ to the value of the selected component from the characteristic functions $\psi$ of interference appearing first (oldest characteristic function $\psi$ of interference among the ordered characteristic functions $\psi$ of interference).

In a following step S903, the processing device sets a parameter $Z^{(4)}$ to the value of the selected component from the characteristic functions $\psi$ of interference appearing next according to the order in which the characteristic functions are presented in the step S900.

In a following step S904, the processing device updates the parameter $X^{(4)}$ with the following expression, for the selected component:

$$(1-g) \cdot X^{(4)} + g \cdot Z^{(4)}$$

where g is a predefined forgetting factor such that g<1 and preferably such that g>0.5.

In a following step S905, the processing device checks whether all the characteristic functions $\psi$ of interference obtained in the step S900 have been considered for the selected component. If this is the case, a step S906 is performed; otherwise, the step S903 is repeated by setting the parameter $Z^{(4)}$ to the value of the selected component from the next characteristic function $\psi$ of interference in order of appearance (according to the order in which the characteristic functions $\psi$ of interference were ordered in the step S900).

In the step S906, the processing device inserts the value of the parameter $X^{(4)}$ in a resulting characteristic function $\psi$ of interference, the parameter $X^{(4)}$ defining the value of the selected component in the resulting characteristic functions $\psi$ of interference.

In a following step S907, the processing device checks whether all the components present in the characteristic functions $\psi$ of interference obtained in the step S900 have been considered. If this is the case, a step S908 is performed; otherwise, the step S901 is repeated by selecting another component to be considered for performing the merging operation.

In the step S908, the processing device outputs the characteristic function $\psi$ of interference resulting from the merging operation.

The algorithm of FIG. 9 is therefore adapted to average, with forgetting factor, the characteristic functions $\psi$ of interference on a per component basis. Another approach is to merge the characteristic functions $\psi$ of interference by using the arithmetic mean for each component, i.e. for each component, summing the values of said component of the characteristic functions $\psi$ of interference and dividing the resulting total by the quantity of characteristic functions $\psi$ of interference.

FIG. 10 schematically represents an algorithm for merging observations of interference, in the form of respective characteristic functions $\psi$ of interference, when updating the fingerprint map. The algorithm of FIG. 10 is performed by the device of the wireless telecommunication system which is in charge of implementing the fingerprint map. Let's illustratively consider that the algorithm of FIG. 10 is performed by the processing device (i.e. the fingerprint map is co-localized with the processing device).

In a step S1000, the processing device obtains observations of interference, in the final of characteristic functions $\psi$ of interference, which have been performed during a journey of a moving conveyance over the path 170. Said observations of interference have been performed for a each portion of the path 170. Said observations of interference have to be merged, if any, with observations of interference related to at least one previous journey over the path 170. When no observations of interference related to at least one previous journey over the path 170 are available, the processing device stores in the fingerprint map the observations of interference obtained in the form of characteristic functions $\psi$ of interference in the step S1000 and ends the algorithm of FIG. 10.

In a following step S1001, the processing device obtains the observations of interference, in the form of characteristic functions $\psi$ of interference, which are related to at least one previous journey over the path 170, as previously stored in the fingerprint map. When said observations of interference are representative of plural journeys over the path 170, said observations of interference consist of a single merged characteristic function $\psi$ of interference for each portion of the path 170.

In a following step S1002, the processing device selects one portion of the path 170.

In a following step S1003, the processing device merges the observations of interference obtained in the step S1000 for said selected portion of the path 170 with the observations of interference obtained in the step S1001 for said selected portion of the path 170. The merging operation is performed on a per component basis. The merging operation is preferably performed, per component, according to the following expression:

$$(1-h) \cdot X^{(5)} + h \cdot Z^{(5)}$$

wherein h is a predefined forgetting factor such that h<1 and preferably such that h>0.5, wherein $X^{(5)}$ represents the observations of interference obtained in the step S1001 for said selected portion of the path 170 and $Z^{(5)}$ represents the observations of interference obtained in the step S1000 for said selected portion of the path 170.

In a following step S1004, the processing device checks whether the observations of interference for all the portions of the path 170 have been considered. When at least one other portion of the path 170 still has to be considered, the step S1002 is repeated by selecting one portion of the path 170 that still has to be considered; otherwise, a step S1005 is performed.

In the step S1005, the processing device stores in the fingerprint map the merged characteristic function ψ of interference obtained during the execution of the step S1003. The stored values are then intended to be used by the processing device to obtain the first observations of interference and the second observations of interference when having to perform interference estimation during an upcoming journey of a moving conveyance over the path 170.

The invention claimed is:

1. A method performed by a processing device for performing an interference estimation of an interference expected to be encountered by downlink communications in a wireless telecommunication system toward a communication device located inside a moving conveyance moving over a path, the interference being expected to be encountered due to presence of wayside interferers and presence of on-board interferers, wherein wayside interferers are devices present along said path and generating signals in a same frequency band as considered downlink communications within the wireless telecommunication system, and on-board interferers are devices present in a considered moving conveyance moving over the path and generating signals in the same frequency band as the considered downlink communications within the wireless telecommunication system, wherein the processing device performs:
 obtaining first observations of interference with downlink communications performed during at least one first journey along the path for at least one first portion of said path, said first observations being representative of a combination of interference induced by any wayside interferers present along said first portion(s) of said path and of interference induced by any on-board interferers present during said first journey(s) over said first portion(s) of said path;
 obtaining second observations of interference with downlink communications performed during the first journey(s) along the path for a second portion of said path, said second portion being located closer than said first portion(s) on said path regarding a destination of said moving conveyance, said second observations being representative of a combination of interference induced by any wayside interferers present along said second portion of said path and of interference induced by any on-board interferers present during said first journey(s) over said second portion of said path; and
 obtaining third observations of interference with downlink communications performed during a second journey for said first portion(s) of said path, said third observations being representative of a combination of interference induced by any wayside interferers present along said first portion(s) of said path and of interference induced by any on-board interferers present during said second journey over said first portion(s) of said path;

characterised in that the processing device further perform the interference estimation of the interference expected to be encountered by downlink communications toward the communication device located inside the moving conveyance when the moving conveyance is on said second portion of said path during said second journey, by combining the obtained first, second and third observations such that the part of the third observations which is related to interference induced by wayside interferers is substantially compensated by the first observations and the part of the second observations which is related to interference induced by on-board interferers is substantially compensated by the first observations.

2. The method according to claim 1, characterized in that:
the first observations of interference and the third observations of interference relate to one first portion of the path;
the first observations of interference and the second observations of interference relate to one first journey;
the first, second and third observations of interference are histograms representative of interference probability density functions;
and in that the processing device performs:
 applying a Discrete Fourier Transform operation to each histogram of the first, second and third observations of interference, in order to obtain a discrete version of a characteristic function corresponding to said histogram;
 determining, independently for each value of a frequency index l, an estimation $\psi^*_{n,k}$ of a characteristic function $\psi_{n,k}$ of the interference encountered by the downlink communications toward the communication device located inside the moving conveyance when the moving conveyance is on said second portion of said path during said second journey, as follows:

$$\psi^*_{n,k}(l) \approx \frac{\psi_{n,k'}(l)\psi_{n',k}(l)}{\psi_{n',k'}(l)}$$

wherein $\psi_{n,k'}$ represents the characteristic function of interference obtained for the second observations of interference, $\psi_{n',k}$ represents the characteristic function of interference obtained for the third observations of interference, wherein $\psi_{n',k'}$ represents the characteristic function of interference obtained for the first observations of interference; and
 performing the interference estimation in the form of an histogram representative of an interference probability density function, by applying an Inverse Discrete Fourier Transform operation to the estimation $\psi^*_{n,k}$.

3. The method according to claim 2, characterized in that a fingerprint map stores, for each portion of the path, observations of interference performed during preceding journeys over the path in the form of respective histograms of interference, and in that the processing device performs, before performing the interference estimation:
 merging the observations stored in the fingerprint map with respect to plural first portions, so as to obtain the first observations of interference in the form of a merged histogram of interference that relates to one virtual first journey and to one virtual first portion;

merging the observations stored in the fingerprint map with respect to the second portion, so as to obtain the second observations of interference in the form of a merged histogram of interference that relates to said virtual first journey; and merging observations performed during said second journey with respect to the first portions, so as to obtain the third observations of interference in the form of a merged histogram of interference that relates to said virtual first portion.

4. The method according to claim 2, characterized in that a fingerprint map stores, for each portion of the path, one histogram of interference representative of merged observations of interference performed during preceding journeys over the path, and in that the processing device performs, before updating the fingerprint map with new observations:

merging, for each portion of the path, a part of the new observations performed with respect to said portion of the path and the observations stored in the fingerprint map with respect to said portion, in order to obtain a merged histogram of interference that relates to one virtual first journey over said portion;

storing in the fingerprint map, for each portion of the path, the merged histogram of interference obtained with respect to said portion of the path;

and in that the processing device performs, before performing the interference estimation:

merging the observations stored in the fingerprint map with respect to plural first portions, so as to obtain the first observations of interference in the form of a merged histogram of interference that relates to one virtual first portion; and merging observations performed during said second journey with respect to the first portions, so as to obtain the third observations of interference in the form of a merged histogram of interference that relates to said one virtual first portion.

5. The method according to claim 1, characterized in that:

the first observations of interference and the third observations of interference are representative of one first portion of the path;

the first observations of interference and the second observations of interference are representative of one first journey;

the first, second and third observations of interference are characteristic functions of interference;

and in that the processing device performs:

performing the estimation of interference in the form of a characteristic function, by determining, independently for each value of a frequency index l, an estimation $\psi^*_{n,k}$ of said characteristic function, as follows:

$$\psi^*_{n,k}(l) \approx \frac{\psi_{n,k'}(l)\psi_{n',k}(l)}{\psi_{n',k'}(l)}$$

wherein $\psi_{n,k'}$ represents the characteristic function of interference obtained for the second observations of interference, $\psi_{n',k}$ represents the characteristic function of interference obtained for the third observations of interference, wherein $\psi_{n',k'}$ represents the characteristic function of interference obtained for the first observations of interference.

6. The method according to claim 5, characterized in that a fingerprint map stores, for each portion of the path, observations of interference performed during preceding journeys over the path in the form of respective characteristic function of interference, and in that the processing device performs, before performing the interference estimation:

merging the observations stored in the fingerprint map with respect to plural first portions, so as to obtain the first observations of interference in the form of a merged characteristic function of interference that relates to one virtual first journey and to one virtual first portion;

merging the observations stored in the fingerprint map with respect to the second portion, so as to obtain the second observations of interference in the form of a merged characteristic function of interference that relates to said virtual first journey; and merging observations performed during said second journey with respect to the first portions, so as to obtain the third observations of interference in the form of a merged characteristic function of interference that relates to said virtual first portion.

7. The method according to claim 5, characterized in that a fingerprint map stores, for each portion of the path, one characteristic function of interference representative of merged observations of interference performed during preceding journeys over the path, and in that the processing device performs, before updating the fingerprint map with new observations:

merging, for each portion of the path, a part of the new observations performed with respect to said portion of the path and the observations stored in the fingerprint map with respect to said portion, in order to obtain a merged characteristic function of interference that relates to one virtual first journey over said portion;

storing in the fingerprint map, for each portion of the path, the merged characteristic function of interference obtained with respect to said portion of the path;

and in that the processing device performs, before performing the interference estimation:

merging the observations stored in the fingerprint map with respect to plural first portions, so as to obtain the first observations of interference in the form of a merged characteristic function of interference that relates to one virtual first portion; and merging observations performed during said second journey with respect to the first portions, so as to obtain the third observations of interference in the form of a merged characteristic function of interference that relates to said one virtual first portion.

8. The method according to claim 1, characterized in that:

the first observations of interference and the third observations of interference relate to one first portion of the path;

the first observations of interference and the second observations of interference relate to one first journey;

the first, second and third observations of interference are average values of interference level;

and in that the processing device performs the interference estimation in the form of an average value of interference level by adding the third observations to the second observations and further subtracting the first observations.

9. The method according to claim 8, characterized in that a fingerprint map stores, for each portion of the path, observations of interference performed during preceding journeys over the path in the form of respective average values of interference level, and in that the processing device performs, before performing the interference estimation:
- merging the observations stored in the fingerprint map with respect to plural first portions, so as to obtain the first observations of interference in the form of a merged average value of interference level that relates to one virtual first journey and to one virtual first portion;
- merging the observations stored in the fingerprint map with respect to the second portion, so as to obtain the second observations of interference in the form of a merged average value of interference level that relates to said virtual first journey; and
- merging observations performed during said second journey with respect to the first portions, so as to obtain the third observations of interference in the form of a merged average value of interference level that relates to said virtual first portion.

10. The method according to claim 8, characterized in that a fingerprint map stores, for each portion of the path, one average value of interference level representative of merged observations of interference performed during preceding journeys over the path, and in that the processing device performs, before updating the fingerprint map with new observations:
- merging, for each portion of the path, a part of the new observations performed with respect to said portion of the path and the observations stored in the fingerprint map with respect to said portion, in order to obtain a merged average value of interference level that relates to one virtual first journey over said portion;
- storing in the fingerprint map, for each portion of the path, the merged average value of interference level obtained with respect to said portion of the path;
- and in that the processing device performs, before performing the interference estimation:
  - merging the observations stored in the fingerprint map with respect to plural first portions, so as to obtain the first observations of interference in the form of a merged average value of interference level that relates to one virtual first portion; and
  - merging observations performed during said second journey with respect to the first portions, so as to obtain the third observations of interference in the form of a merged average value of interference level that relates to said one virtual first portion.

11. The method according to claim 1, characterized in that:
- the first observations of interference and the third observations of interference relate to plural N−1 first portions of the path;
- the first observations of interference and the second observations of interference relate to plural K−1 first journeys;
- the first, second and third observations of interference are average values of interference level;
- and in that the processing device performs the interference estimation in the form of an average value of interference level by determining a value eU such that:

eU=(eA)F(EU)

wherein e is a vector of size equal to NK such that:

e=[1, 0, . . . , 0]

wherein E is a matrix of size equal to (NK−1)×(NK), as follows:

$$E = \begin{bmatrix} 0 & 1 & 0 & \cdots & 0 \\ 0 & 0 & \ddots & \ddots & \vdots \\ 0 & \vdots & \ddots & \ddots & 0 \\ 0 & 0 & \cdots & 0 & 1 \end{bmatrix}$$

wherein U is a vector of interference that presents firstly the average value of interference level to be estimated, then the observations performed along the K−1 first portions during the second journey in inverse order compared to the order in which said first portions appear on said path, and then similarly the observations performed along the K portions of the path during the first journeys in inverse order compared to the order in which said journeys occurred, wherein A is a matrix of size equal to NK×(N+K) consisting of two vertical groups of K sub-matrices, the first group in sequence consisting of K identity matrices of size N arranged vertically, the last group in sequence consisting of K sub-matrices of size N×K having a column with ones at the i-th position and columns of zeros elsewhere, wherein i is the value of an index from 1 to K representative of the vertical position of the considered sub-matrix, wherein F is a matrix such that:

EAFEU=EU and wherein the matrix F is obtained during a pre-processing step by minimizing the following over-determined least square problem:

|EAF−I|² wherein I is an identity matrix.

12. The method according to claim 1, characterized in that, when the first observations of interference and the third observations of interference relate to plural first portions of the path, said first portions are consecutive portions of the path, and in that the second portion of the path immediately follows, on the path, the last first portion in sequence.

13. Non-transitory information storage medium, characterized in that it stores a computer program comprising program code instructions which can be loaded in a programmable device for implementing the method according to claim 1, when the program code instructions are run by the programmable device.

14. A processing device adapted for performing an interference estimation of an interference expected to be encountered by downlink communications in a wireless telecommunication system toward a communication device located inside a moving conveyance moving over a path, the interference being expected to be encountered due to presence of wayside interferers and presence of on-board interferers, wherein wayside interferers are devices present along said path and generating signals in a same frequency band as considered downlink communications within the wireless telecommunication system, and on-board interferers are devices present in a considered moving conveyance moving over the path and generating signals in the same frequency band as the considered downlink communications within the wireless telecommunication system, wherein the processing device comprises:
   means for obtaining first observations of interference with downlink communications performed during at least one first journey along the path for at least one first portion of said path, said first observations being representative of a combination of interference induced by any wayside interferers present along said first portion(s) of said path and of interference induced by any on-board interferers present during said first journey(s) over said first portion(s) of said path;
   means for obtaining second observations of interference with downlink communications performed during the first journey(s) along the path for a second portion of said path, said second portion being located closer than said first portion(s) on said path regarding a destination of said moving conveyance, said second observations being representative of a combination of interference induced by any wayside interferers present along said second portion of said path and of interference induced by any on-board interferers present during said first journey(s) over said second portion of said path; and
   means for obtaining third observations of interference with downlink communications performed during a second journey for said first portion(s) of said path, said third observations being representative of a combination of interference induced by any wayside interferers present along said first portion(s) of said path and of interference induced by any on-board interferers present during said second journey over said first portion(s) of said path;
characterized in that the processing device further comprises:
   means for performing the interference estimation of the interference expected to be encountered by downlink communications toward the communication device located inside the moving conveyance when the moving conveyance is on said second portion of said path during said second journey, by combining the obtained first, second and third observations such that the part of the third observations which is related to interference induced by wayside interferers is substantially compensated by the first observations and the part of the second observations which is related to interference induced by on-board interferers is substantially compensated by the first observations.

* * * * *